March 6, 1956 F. W. SEYBOLD ET AL 2,737,158
AUTOMATIC BACK GAUGE SPACER
Filed Dec. 9, 1950 19 Sheets-Sheet 1

INVENTORS
FREDERICK W. SEYBOLD AND
NICHOLAS HERMAN
BY
Ostrolenk & Faber
ATTORNEYS March 6, 1956  F. W. SEYBOLD ET AL  2,737,158
AUTOMATIC BACK GAUGE SPACER Filed Dec. 9, 1950  19 Sheets-Sheet 2

INVENTORS
FREDERICK W. SEYBOLD AND
NICHOLAS HERMAN
BY
Ostrolenk & Faber
ATTORNEYS March 6, 1956 F. W. SEYBOLD ET AL 2,737,158
AUTOMATIC BACK GAUGE SPACER
Filed Dec. 9, 1950 19 Sheets-Sheet 3

INVENTORS
FREDERICK W. SEYBOLD AND
NICHOLAS HERMAN
BY
Ostrolenk & Faber
ATTORNEYS

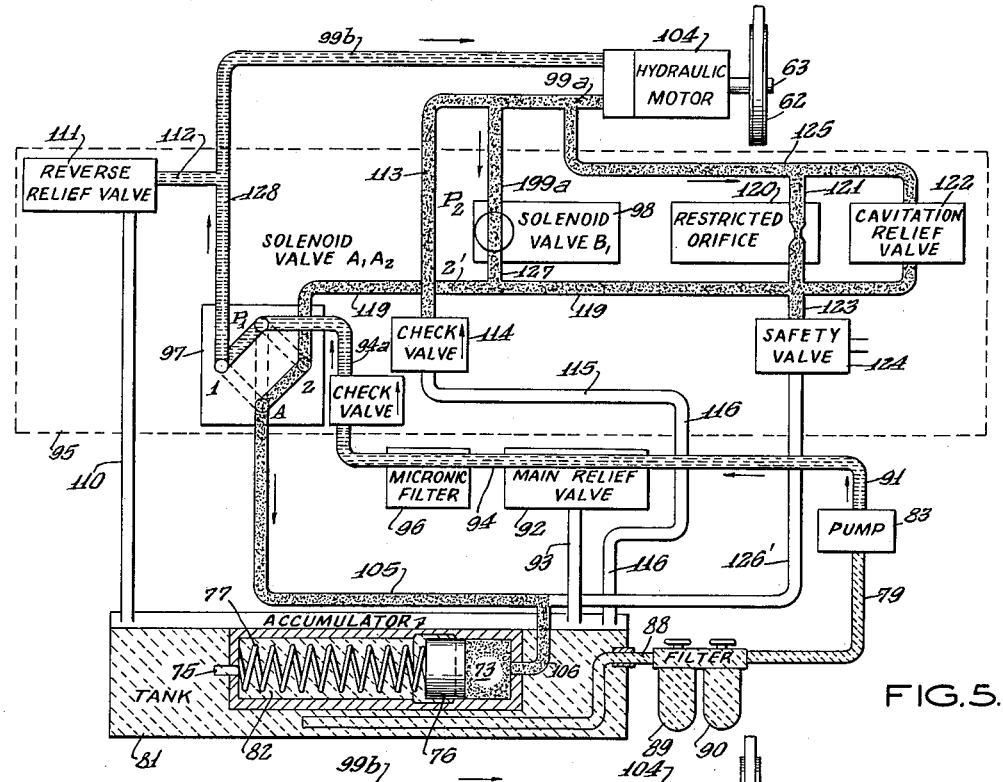

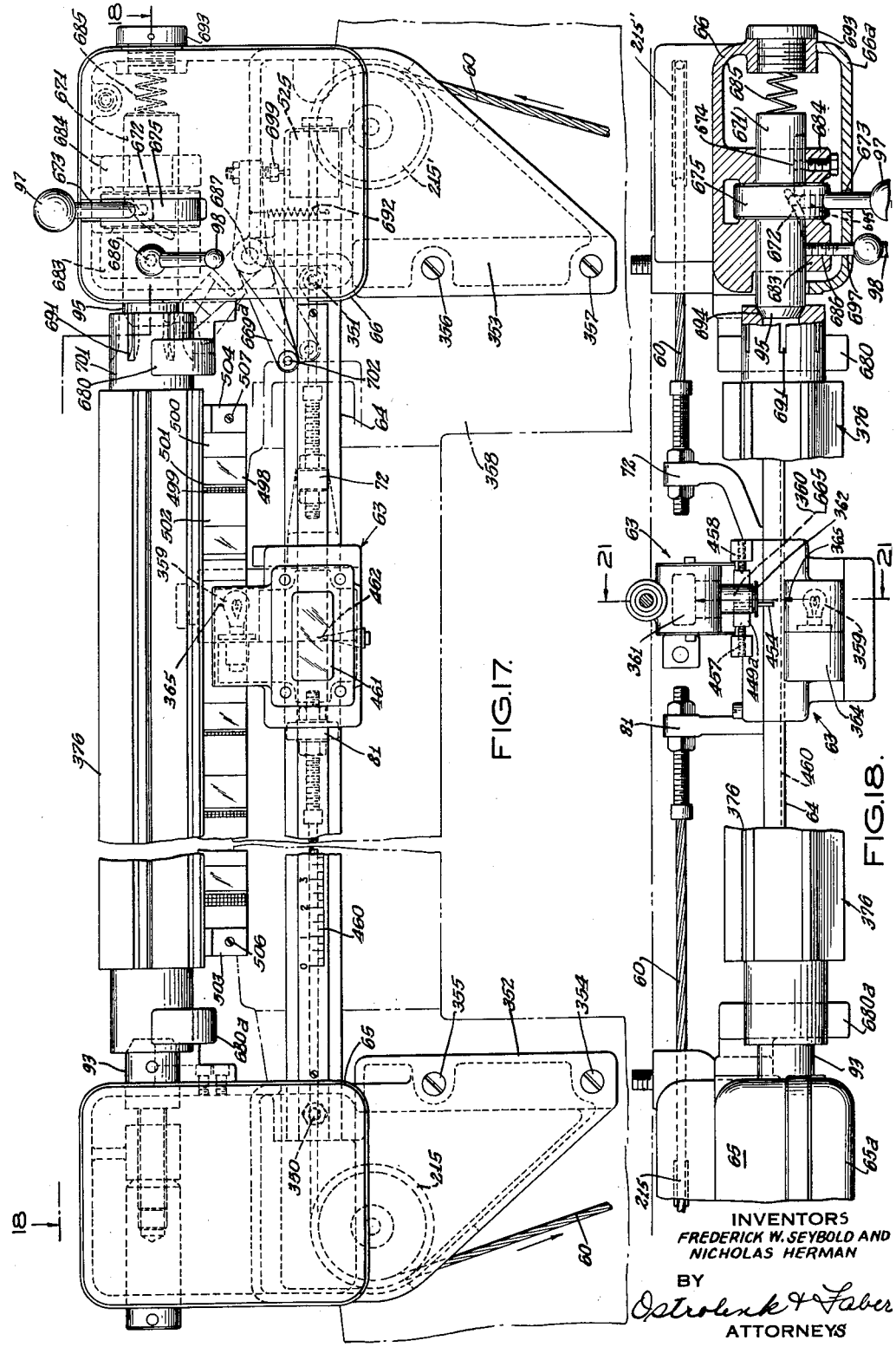

March 6, 1956  F. W. SEYBOLD ET AL  2,737,158
AUTOMATIC BACK GAUGE SPACER
Filed Dec. 9, 1950  19 Sheets-Sheet 15

INVENTORS
FREDERICK W. SEYBOLD AND
NICHOLAS HERMAN
BY
Ostrolenk & Faber
ATTORNEYS March 6, 1956  F. W. SEYBOLD ET AL  2,737,158
AUTOMATIC BACK GAUGE SPACER
Filed Dec. 9, 1950  19 Sheets-Sheet 16
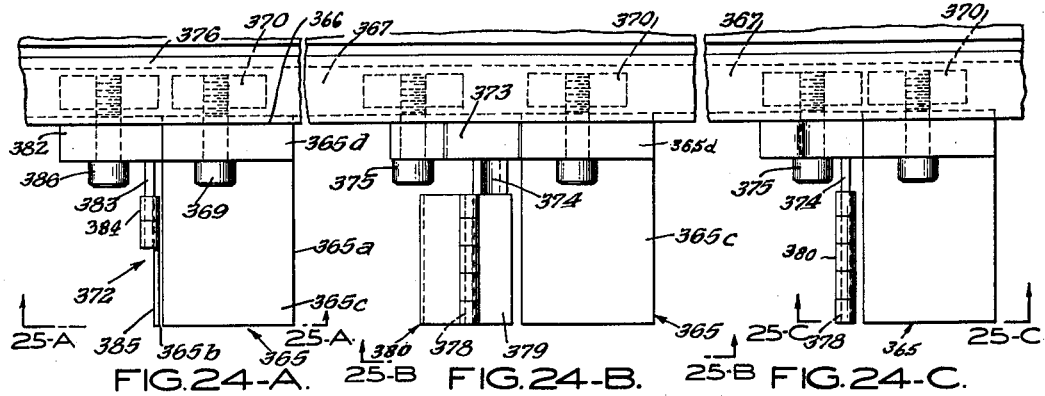
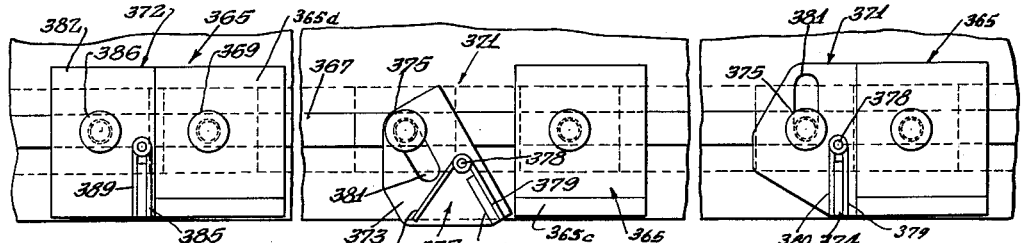
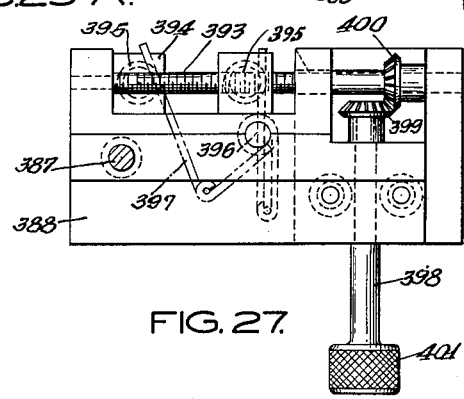
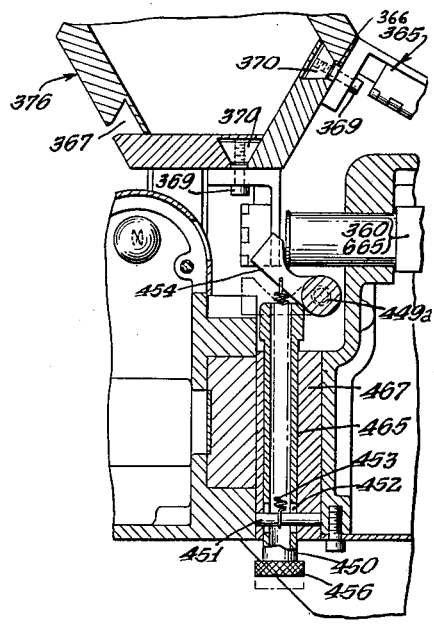
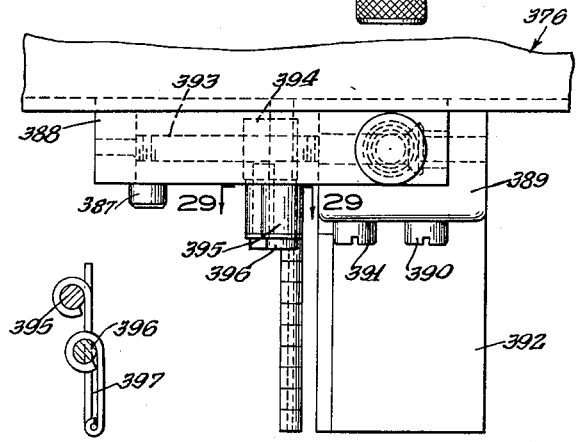
INVENTORS
FREDERICK W. SEYBOLD AND
NICHOLAS HERMAN
BY
Ostrolenk & Faber
ATTORNEYS March 6, 1956  F. W. SEYBOLD ET AL  2,737,158
AUTOMATIC BACK GAUGE SPACER
Filed Dec. 9, 1950  19 Sheets-Sheet 17

INVENTORS
FREDERICK W. SEYBOLD AND
NICHOLAS HERMAN
BY
Ostrolenk & Faber
ATTORNEYS March 6, 1956 F. W. SEYBOLD ET AL 2,737,158
AUTOMATIC BACK GAUGE SPACER
Filed Dec. 9, 1950 19 Sheets-Sheet 18

INVENTORS
FREDERICK W. SEYBOLD AND
NICHOLAS HERMAN
BY
Ostrolenk & Faber
ATTORNEYS March 6, 1956   F. W. SEYBOLD ET AL   2,737,158
AUTOMATIC BACK GAUGE SPACER
Filed Dec. 9, 1950   19 Sheets-Sheet 19

INVENTORS
FREDERICK W. SEYBOLD AND
NICHOLAS HERMAN
BY
Ostrolenk & Faber
ATTORNEYS

2,737,158
AUTOMATIC BACK GAUGE SPACER

Frederick W. Seybold, Westfield, N. J., and Nicholas Herman, Bronx, N. Y., assignors to E. P. Lawson Co., Inc., New York, N. Y., a corporation of New York Application December 9, 1950, Serial No. 200,013

5 Claims. (Cl. 121—45)

Our present invention relates to stop and trim out units, electrical circuits for electrically controlled automatic hydraulic spacing mechanism and more particularly to stop and trim out units and electrical circuits for automatic spacing mechanism specifically designed for use in connection with guillotine type paper cutters.

In the operation of guillotine type paper cutters, a pile of paper is placed on the work table beneath the cutting knife. The back gauge usually provided on the work table is then adjusted so that the portion of the pile which it is desired to cut off extends forward of the cutting knife edge so that when the knife is brought down, it will cut off an exactly dimensioned section of the pile.

In operating paper cutters of this type, therefore, it frequently becomes necessary to adjust the back gauge many times for different cuts which are to be made. Even if a plurality of regular cuts are to be made from a single pile, the back gauge must be moved up each time in order to ensure that the edges are perfectly squared so that the exact cut may be made.

An object of our invention is the provision of a novel stop unit for a photo-electric cell circuit that controls the automatic back gauge spacing mechanism which moves the back gauge at successive individually predetermined intervals after successive cuts.

By the use of our invention, therefore, the operator need do nothing more than place the initial pile of paper on the machine against the back gauge and arrange a program of stop units. The operator then operates the paper cutter each time a signal lamp flashes so that the knife moves up and down the desired number of times to cut the desired number of piles.

A further object of our invention is to provide a signal light which will indicate to the operator that the back gauge has come to the predetermined stop.

The program of stop units will control the spacing mechanism so that the back gauge driving mechanism automatically moves the back gauge the proper distance at the end of each cut and before the next cut is started.

Automatic operation of the back gauge is already known as shown in Patent No. 2,053,499 and in pending application Serial No. 113,717, now Patent No. 2,628,680.

Our invention is directed specifically to stop units and electrical circuits. The stop units interrupt a light beam and thus permit the electrical circuit to exercise proper control of the electrically controlled elements for successively moving the back gauge by predetermined intervals after individual cuts.

The stop and trim out units are used in conjunction with a carriage moving transversely across the front of the cutting machine in synchronism with the movement of the back gauge and moves with a speed equal to that of the back gauge.

A photo-sensitive medium, such as a photo-electric tube, and a light source are borne by the carriage across the front of the machine and a stationary program of stop units is located between the light source and the photo-sensitive medium.

A hydraulic driving mechanism is provided for the back gauge and is controlled by the novel electrical circuits of our invention. The electrical circuits are switched on and off to control the driving mechanism by the manner in which light falls on the photo-sensitive medium as determined by the program of stop units.

In its simplest form, the stop units are rectangular members, the left-hand edges of which are each spaced from each other by the exact distance which the back gauge is to travel between successive cuts.

In another form, the program of stop units can be reproduced and replaced by a transparent regulating strip which is provided with a plurality of successive rectangular opaque sections, the left-hand edges of which also may be spaced from each other by the exact distance which the back gauge is to travel between successive cuts.

When the operation of the back gauge is initiated, a light beam passes in the space between stop units or through the rectangular transparent area of the regulating strip. This operation takes place at full speed to drive the back gauge forward rapidly. At the same time, the carriage is driven transversely from right to left at equal speed through cable attachments to the back gauge.

When light from the light source is first interrupted by the right-hand edge of the stop unit or the right-hand edge of the opaque section in the regulating strip, circuits are operated to reduce the forward speed of the back gauge and the carriage to a slow speed.

When the light from the light source is again permitted to impinge upon the photo-electric cell by the left-hand edge of the stop unit or opaque section, the back gauge and the carriage are halted in their movement.

Thus, a heavy pile of paper may be brought up rapidly by the back gauge to near the point where it is to be stopped. Thereafter, it is slowed down and then finally brought to a stop. The slow-down interval prevents a sudden stop of the back gauge from causing a paper pile to cross beyond the predetermined position.

Thus, the final speed of the back gauge and its carriage may be as little as 1% of the speed at which the paper pile is brought up close to the stopping point.

Thus, the width of the rectangular stop units and/or opaque sections depends on the rapidity with which the electric relays, solenoids, and valves respond to the light signals to slow down the paper pile sufficiently so that it will be stopped accurately.

Preferably, the initiation of the back gauge operation is so arranged that the lifting of the knife and clamp clear of the paper pile will set the apparatus in motion by means of a knife switch, although a by-pass switch may be provided so that the back gauge may be set in motion manually when desired.

The primary object of our invention is the provision of a novel construction and adjustment of stop units set between a photo-sensitive medium and a light source which moves synchronously with the back gauge to alternately interrupt and permit passage of the light beam at predetermined positions of the back gauge. The control elements are so arranged that the first change in the light conditions due to the right-hand edge of the stop unit after the initiation of fast operation will cause the back gauge to be slowed down and the second change in the light condition due to the left-hand edge of the stop unit after initiation of the operation will cause the back gauge to be stopped. That is, the darkening of the photo-sensitive medium will cause a slow down and the relighting of the photo-sensitive medium will cause the hydraulic means to stop the back gauge.

When the cutting machine is called upon to cut labels or other material printed upon the sheets of the pile of paper, the back gauge is required to move forward an inch or more between each cutting operation. However, on printed sheets where many rows of labels or the like appear, there is also found a small strip of between 1/16" to 3/4" which is unprinted. These unprinted strips are due to the plate hooks which are located between adjacent printing plates to clamp these plates to the printing cylinder as is well-known in the art. Hence, after the back gauge has been moved forward several cycles of fast and slow speed to cut a series of printed label rows, it becomes necessary that the back gauge move forward only a fraction of an inch to permit the cutting of the small unprinted strips. Therefore, it is necessary that the back gauge start to move forward at a slow speed and then come to a stop.

For this purpose a time delay relay is incorporated in the electric circuit whereby the back gauge moves forward at slow speed for a fraction of a second so that the photo-sensitive medium will be darkened in case the next adjacent stop unit is only a short distance from the preceding one before the hydraulic means is conditioned for fast forward speed. If the back gauge were to start moving forward at a fast speed, the inertia of the system would not permit it to stop accurately after a fractional inch of travel and thus the cutting operation would not take place at the proper location on the pile of paper.

For the purpose of trimming out these small strips of unprinted paper, a special light beam interrupting unit is provided. This special means is called a trim out unit which controls the back gauge movement in such a manner that it will start to move forward from a stopped position at a slow speed, travel the fractional inch of the unprinted strip and then come to a stop.

Another object of our invention is a novel construction and adjustment of a trim out unit to be used with the heretofore mentioned stop units. The trim out unit is placed to the left of a stop unit so that the distance between the right edge of the former and the left edge of the latter forms a narrow slit.

Still another object of our invention is a novel electrical circuit in which a time delay relay is incorporated to function in coordination with trim out units to permit trim out operation at slow speed.

The movement of the back gauge is as follows:

The carriage is to the right of the stop unit. Full light impinges upon the photo-electric cell so that after a cutting operation is completed upward movement of the knife blade will initiate slow speed for a fraction of a second to be followed by fast forward movement of the back gauge. Due to the cable attachment between the back gauge and carriage, the carriage will move to the left and when it reaches the right-hand edge of the stop unit, the light beam will be interrupted by the stop unit to cause the back gauge to now move forward at a slow speed. As the back gauge continues to move slowly forward and the carriage reaches the left-hand edge of the stop unit, the light beam will again be permitted to impinge upon the photo-electric cell and thus cause the hydraulic system to bring the back gauge to an accurate stop.

Assuming that a trim out unit is adjacent the stop unit, a slit of only a fractional inch will exist between these two units through which the light beam will pass. If a green light signal has flashed, indicating that an accurate stop has been made, the operator can then start the cutting operation. When the knife blade on its return upward movement closes the knife switch, it will initiate slow speed of the back gauge for a fraction of a second. However, within this fractional second period, the carriage will reach the right-hand edge of the trim out and the light beam will again be interrupted. As heretofore noted, this will permit the back gauge to continue to advance at a slow speed until the light beam and carriage reach the left-hand edge of the trim out unit. At this point, the light beam is again permitted to impinge upon the photo-electric cell and will cause the electrically controlled hydraulic driving mechanism to bring the back gauge to a stop. If the green signal light indicates that an accurate stop has been made, the cutting operation can take place to trim out the strip of unprinted paper. Since the carriage comes to a stop at the left-hand edge of the trim out unit where light impinge upon the photo-electric cell, the electrical circuit is in condition to cause the hydraulic driving mechanism to move the back gauge forward as described before.

The stop units and more particularly the trim out units must be properly adjusted individually in accordance with the desired spaced cutting operations required. In addition, these units must be adjusted and positioned with respect to each other and thus a combination member containing both a stop unit and a trim out unit is provided.

Accordingly, another object of our invention is a combination trim out and stop unit to facilitate and alleviate some of the positioning problems.

The stop units and trim out units are fastened to a stationary hexagonal bar located above the carriage containing the photo-sensitive medium and light beam. The units are movable against a scale and viewed through an opening in the carriage to permit their proper location on the stationary hexagonal bar. After being properly positioned in this manner, the units will cause light interruption and relighting to occur corresponding to the spacing requirements of the back gauge.

Our invention provides a novel blocking member and control which is mounted and controlled from the carriage and is used for positioning the stops on the hexagonal bar relative to the photo-sensitive medium which is attached to the carriage. The back gauge and carriage are moved to the predetermined cutting location, and the blocking member is manually moved in the path of the units. A unit is then moved along the stationary hexagonal bar until it engages the blocking member. This location of the unit on the hexagonal bar will then be in proper predetermined position relative to the photo-tube and it may then be securely fastened to the bar at this point.

Accordingly, another object of our invention is to provide a blocking member and control so that the stop unit may be positioned properly on the hexagonal bar so that a program of stop units may be arranged to result in the required spaced movements of the back gauge.

The foregoing and many other objects of our invention will become apparent in the following description and drawings in which:

Figures 5 to 8 are schematic views of the hydraulic operating mechanism illustrating the operation of the mechanism for fast forward motion (Figure 5), slow forward motion (Figure 6), stopping of the back gauge (Figure 7), and reverse movement of the back gauge (Figure 8).

Figure 14 also shows the circuit to energize the green light circuit.

Figure 17 is a view similar to Figure 2 and is an enlarged partial front view of the cutting machine showing the transparent strip units.

Figure 18 is a view taken along line 18—18 of Figure 17 and shows the cable attachment to the carriage and the photo-electric cell light source combination carried by the carriage.

Figure 23 is a view similar to Figure 21 showing the blocking member when it is interposed in the path of a stop unit.

Figure 24a is a side view of a novel combination stop unit and trim out unit of our invention.

Figures 24b and 24c are side views of another novel combination stop unit of our invention. Figure 24b shows the trim out unit adjusted for maximum trim out and Figure 24c for minimum trim out.

Figure 25a is a bottom view of the novel combination stop unit of Figure 24a.

Figures 25b and 25c are bottom views of the novel combination stop unit of Figures 24b and 24c.

Figure 27 is a top view of a novel combination stop unit of our invention showing the adjustment means for the trim out unit.

Figure 28 is a front view of the novel combination stop unit of Figure 27.

Figure 29 is a view taken along section 29—29 of Figure 28.

Referring first to Figures 1, 2, 3 and 4, the cutting machine, back gauge and cable attachments used are of the type shown in application Serial No. 114,786 filed September 9, 1949, now Patent No. 2,574,501 and application Serial No. 151,936 filed March 25, 1950, now Patent No. 2,687,011, and operate for the general purposes therein described.

Figure 1:
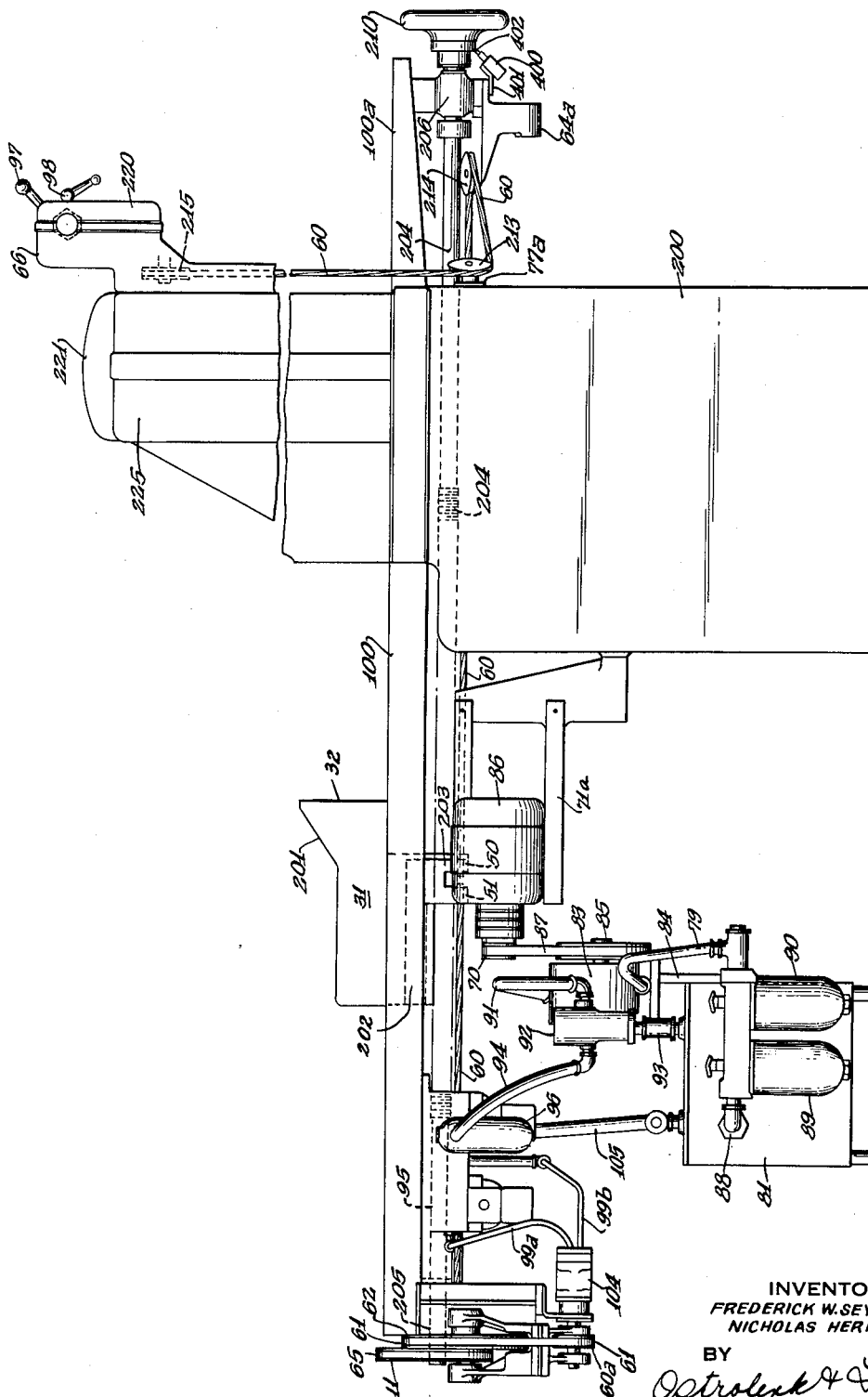
Figure 1 is a side view of the hydraulically operated back gauge mechanism.
Figure 2:
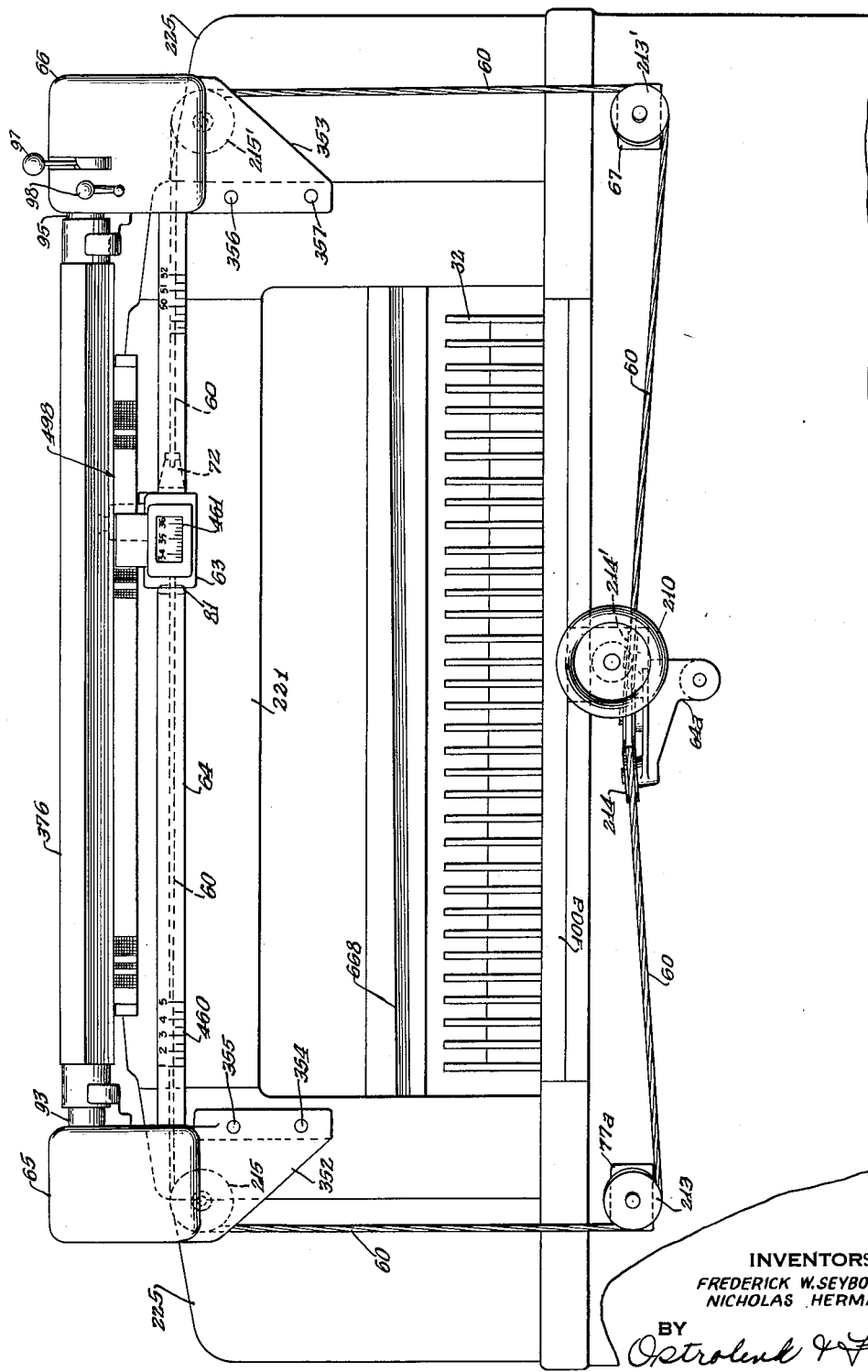
Figure 2 is a front view of the paper cutter of Figure 1 showing the back gauge, cable attachment and controlled carriage of the automatic spacer cutting machine.

Referring to Figures 1 and 2, the paper cutting machine therein shown comprises the side frame casings 225 carrying between them the back plate or cutting table 100. The side frame casings 225 extend upwardly where they are braced by the cross-bracing member 221. The rear end of the cutting table 100 is supported by a bracket (not shown) which also may serve as at least a portion of the support for the back gauge operating mechanism, while the operating mechanism for the paper cutter itself is contained within the housing 200 formed by the front and rear plates of housing 200. This housing, together with the enclosed portion of the side frame members 225 above the level of the table, serves to contain a major portion of the operating mechanism.

The operating mechanism for moving the knife and clamps forms no part of the present invention since the present invention relates to the control of the back gauge alone.

The back gauge 201 comprises a metal casting 31 extending across the cutting table 100 and having a plurality of forward extensions 32 (seen in Figure 2), the aligned front edges of which form the back gauge surface. The cutting table 100 is provided with a longitudinal slot through which the bracket 202 of the back gauge 201 extends downwardly. The bracket 202 has adjacent its lower end the nut 203 which is in threaded engagement with the back gauge feed screw 204.

The back gauge operating mechanism is connected by belt 61 to pulley 62 on a shaft extension 205 of the operating screw 204. Operating screw 204 is rotatably carried in the rear bearing at 205 and the front bearing 206 beneath the forward extension 100a of the cutting table 100. The front of the screw 204 may be provided with a hand wheel 210 for manual rotation of the screw 204. The screw 204 is, of course, so mounted that while it may rotate freely, it can have no longitudinal movement. Accordingly, rotation of screw 204, either by the operating mechanism driving the belt 61 or by hand wheel 210, will result in corresponding longitudinal movement of the back gauge 201 in accordance with the sense of rotation of the screw 204.

The back gauge guide bracket 202 is provided with two depending lugs, a forward lug 50 and a rear lug 51, a cable 60 secured at one end to the lug 50 and at the other end to the lug 51. From the lug 50 the cable 60 passes horizontally over the sheave 214, the sheave 214 being mounted for rotation on bracket 64a supported from the underside of the forward table extension 100a.

The cable 60 then passes to the vertical sheave 213 mounted on bracket 77 on housing 200. The cable 60 then continues up to the vertical sheave 215 mounted at the upper portion of carriage supporting bracket 352 and then is connected to the connecting lug 81 of the indicating carriage 63. The cable 60 from the lug 51 passes horizontally rearward over the horizontal guide roller (not shown) fastened on a bracket at the rear of the underside of table 100.

This portion of the cable 60 then passes over the horizontal sheave 214' on bracket 64a, then to the vertical sheave 213' on bracket 67 at the front end of the machine and then to the vertical sheave 215' secured to the side frame casing 353 and then to lug 72 on the carriage 63.

Carriage 63 is a combined indicating and stop member device and is mounted for slidable movement along the rectangular bar 64 carried between the indicator support brackets 65 and 66 and cooperating with the transparent plastic strip 498 on the bar 376. The carriage 63 thus duplicates exactly the movement of the back gauge 201 moving in one direction when the back gauge 201 moves in the opposite direction.

The length of each movement of the carriage 63 also corresponds exactly to the length of each movement of the back gauge 201. The carriage 63 cooperates with the horizontal scale 460 which is equal in length to the maximum path of movement of the back gauge 201 and may be marked off with appropriate indicia in inches to give the exact location of the back gauge 201 or rather the exact distance of the front face 32 of back gauge 201 from the cutting knife.

Figures 3, 4:
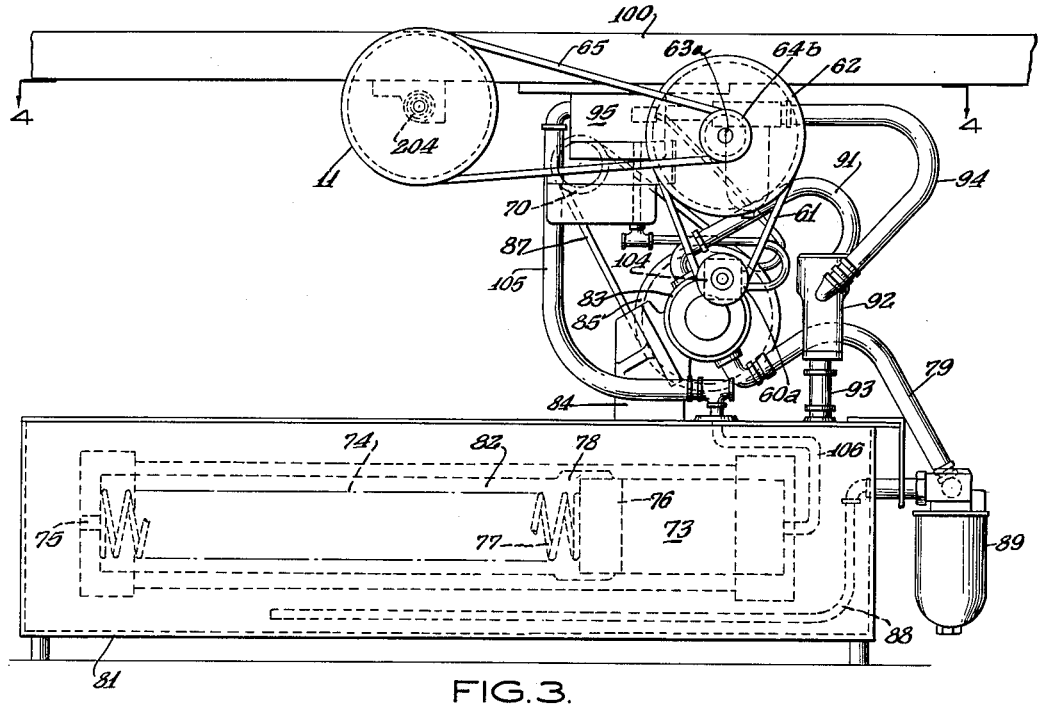
Figure 3 is a rear view of the mechanism of Figure 1.
Figure 4 is a top view of the mechanism of Figure 1 taken from line 4—4 of Figure 3.

Referring to Figures 1, 3 and 4, the reservoir tank 81 for the hydraulic fluid used in the system is located rearwardly of the base frame casting 200. An accumulator cylinder 82 is mounted in tank 81 and immersed in the reservoir oil; this obviates the necessity for extended connections between reservoir 81 and the accumulator cylinder 82.

Bracket 84 is supported on reservoir tank 81 and carries a pump 83 driven by pulley 85 and V belt 87 from pulley 70 of electric motor 86 mounted on bracket 71a carried by the base casting 200.

Pump 83 draws hydraulic fluid from reservoir tank 81 through the pipe 88, filters 89 and 90 and pipe 79 and discharges the hydraulic fluid through flexible hose 91 into the main relief valve 92.

Main relief valve 92 controls the pressure available to drive the back gauge 201 as hereinafter described. Relief valve 92 may, therefore, be adjusted to any selected pressure; its overflow is discharged through pipe 93 directly back to the reservoir tank 81.

Flexible hose 94 conducts hydraulic fluid under pressure from the main relief valve 92 to the micro-filter 96 and then through pipe 94a (see Figure 4) to the solenoid valve sub-base block 95.

Solenoid valve sub-base block 95 is provided with suitable passages hereinafter described in connection with Figures 5 and 8 to establish various hydraulic fluid circuits through the four way solenoid valve 97 and the two way solenoid valve 98.

Pipes 99a and 99b connect the solenoid valve sub-base block 95 with the rotary fluid motor 104. The speed and direction of the fluid motor depends on the setting of solenoid valves 97 and 98.

Flexible hose 105 connects the valve sub-base block 95 to pipe 106 which enters the high pressure chamber 73 of accumulator 82. The low pressure chamber 74 of accumulator 82 communicates through opening 75 with the low pressure fluid in reservoir 81.

Piston 76 is urged by compression spring 77 in chamber 74 toward the right with respect to Figure 2 to create an initial elevated pressure in chamber 73 of accumulator 82. Piston 76 thus forms the boundary between chambers 73 and 74.

As pressure in chamber 73 increases, piston 76 is forced to the left against spring 77 further compressing the same. A relief path for excess pressure in chamber 73 is provided by the recess 78 in accumulator 82. When the piston on being forced to the left with respect to Figure 6, reaches recess 78, the excess fluid under pressure may escape to the low pressure chamber 74 until the spring 77 can move piston 76 back to the right to close the recess 78.

The fluid motor 104 is connected by pulley 60a and belt 61 to pulley 62 on stub shaft 63a. Pulley 64b on stub shaft 63a is connected by belt 65 to pulley 11 on screw 204 which drives the back gauge 201.

Thus, the back gauge 201 is driven by the fluid motor 104 which in turn responds to the direction, pressure and rate of flow of the hydraulic fluid as hereinafter described in connection with Figures 5 and 8.

Motor 86 and pump 83 operate constantly so that the direction, pressure and rate of flow of the hydraulic fluid is determined by the valves 97 and 98. Valves 97 and 98 may be operated in any manner, but it is preferred that they be solenoid operated.

Figure 8:
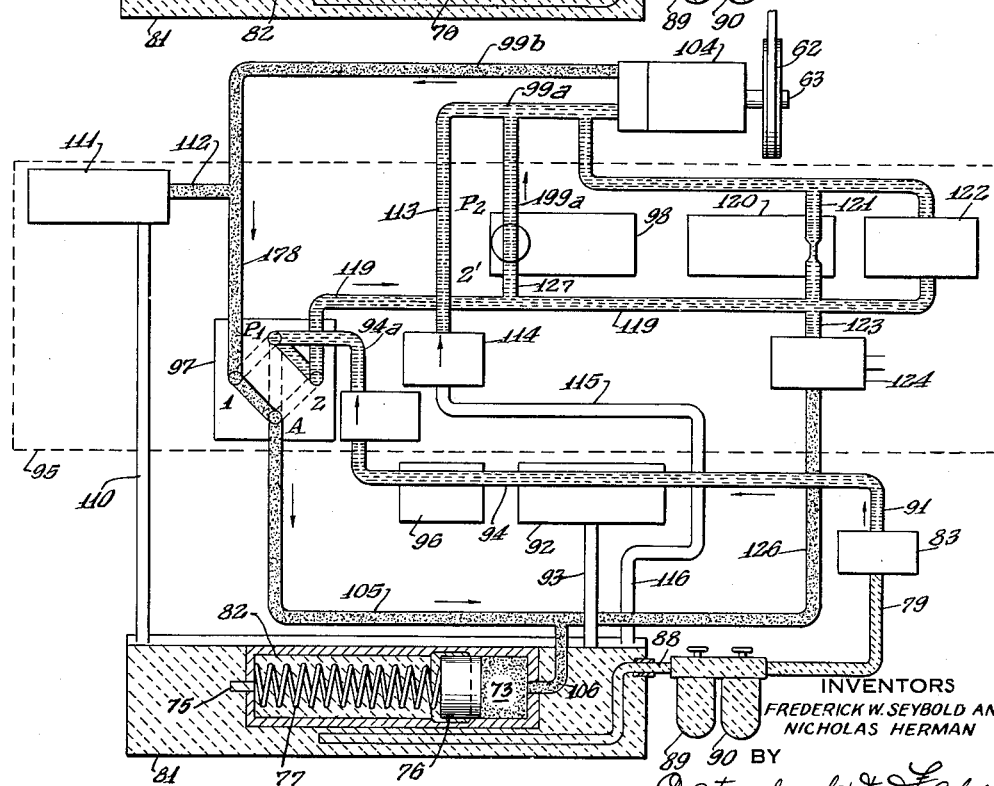

In schematic Figures 5 and 8:

I—A diagonally hatched pipe or area indicates that the fluid therein is at atmospheric or reservoir pressure.

II—A horizontally hatched pipe or area indicates that the fluid therein is at the discharge pressure of pump 83.

III—A dotted pipe or area indicates that the fluid therein is at accumulator pressure.

IV—A blank pipe indicates that there is no fluid therein.

For fast operation of the fluid motor 104 in the forward direction to move the back gauge 201 rapidly in the forward direction, the valves 97 and 98 are set in the positions of Figure 5.

In valve 97, port A connected to pipe 105 is connected to port 2 which is connected by passages 119, 127 to valve 98. Port 1 of valve 97 is connected to passage 128 and also to port $P_1$ which is connected to pipe 94A.

Valve 98 is opened to connect passages 119—127 through valve 98 to passages 199a—99a.

The fluid circuit for fluid motor 104 is then from the discharge port of the pump 83 through passage 91 to the main relief valve 92, through passage 94 into the micro-filter 96 and hence through port 1, through passages 128 and 99b, to the fluid motor 104.

The exhaust of fluid motor 104 is then through passages 99a and 199a to solenoid valve 98 ($B_1$) entering port $P_2$ and leaving port 2', then through passages 127, 119 to port 2 of solenoid valve 97, and out through port A, passages 105 and 106 into the pressure chamber 73 of the accumulator 82.

The speed of fluid motor 104 is thus determined by the difference between the pressure in accumulator chamber 73 as maintained by compression spring 77 and the pressure exerted by pump 83.

This difference in pressure is maintained at a constant rate since the reverse relief valve 111 connected by passage 112 to passage 128 and pipe 99b on one side and by passage 110 on the other side to reservoir 81 is biased to maintain passage 112 closed at pump pressure but to connect passages 112 and 110 at pressures substantially above that of pump 83 to prevent too great a back pressure. The relief pressure at valve 111 must be higher, however, than the relief pressure at main relief valve 92 to permit the slow operation of the back gauge 201 hereinbelow described.

In the operation of a back gauge 201, it is necessary to move the back gauge rapidly between cuts, but to slow down the movement of the back gauge as the end of the movement approaches to prevent coasting of the paper stack beyond the cutting point when the back gauge stops.

This slow down of the movement of the back gauge is brought about by closing the ports $P_2$—2' of the solenoid valve 98 ($B_1$) whereby the only remaining path for the exhaust oil from the fluid motor 104 is through passages 992, 125 and 121 to the restricted orifice 120.

Thus, sudden restriction to oil flow would also build up a high pressure in passage 125 unless said pressure may be relieved through cavitation relief valve 122.

This slows down motor 104 and hence back gauge 201. The excess fluid delivered by the pump 83 which cannot pass through the restricted orifice 120 then discharges through the main relief valve and through pipe 93 into the reservoir 81.

This is the condition shown in Figure 6 wherein all elements are set for forward operation of the back gauge at slow speed.

When the back gauge 201 reaches the stop position (see Figure 7), valve 97 is moved to connect ports P₁ and A and to close the other ports and connections.

The fluid motor 104 is thus cut off and ceases to operate. Pump 83 is then connected by pipes and elements 91, 92, 94, 96, 94a, P₁ of 97, A of 97, 105, 106 to the accumulator chamber 73 where it may charge up accumlator chamber 73.

After the back gauge 201 has completed its forward movement, it must be returned to its initial retracted position so that it may start over again with a new stack of paper.

This is accomplished (as seen in Figure 8) by opening valve 98 and by connecting together ports P₁ and 2 of valve 97 and connecting ports 1 and A of valve 97.

The pump 83 will now deliver pressure oil through 91—92—94—96—94a—P₁ and 2 of valve 97—119—127—P₂ and 2' of valve 98—199a—99a into fluid motor 104.

The function of the reverse relief valve is as follows:

When the motor is turning in reverse and the discharge passage is suddenly blocked by the closing of port 1, the momentum of the motor would build up excessive pressure in the passages 99b and 128 and to relieve this condition the reverse relief valve is provided so that oil may be discharged through passage 112 through valve 111 and passage 110 into the reservoir tank 81.

Reverse relief valve 111 permits excess pressure to bleed off from pipe 128 during the reverse operation.

By this means, therefore, a simplified easily controlled hydraulically operated mechanism is provided to permit the fast forward movement, slow forward movement, stopping and reverse movement of back gauge 201.

The restricted orifice member 120 connected by passage 121 across passages 125—99a and 119 combined with the cavitation relief valve 122 in parallel therewith between these passages serves in a manner well-known in the art of hydraulic mechanism to maintain unimpeded operation of the device.

The function of safety valve 124 is as follows:

When the ports 1 and 2 of the valve 97 are closed to stop the fluid motor 104, its momentum will build up pressure in passage 125; said pressure may be relieved through safety valve 124. While cavitation relief valve 122 can open, oil flow therethrough would still be blocked at valve 97, the setting of safety valve 124 being considerably higher than that of valve 122.

By the means herein described, the various movements of the back gauge 201 may be automatically controlled by elements which respond to movement of the back gauge to predetermined positions to slow and then stop the back gauge. Valves 97 and 98 are operated for forward or reverse movement as the case may be.

The valves 97 and 98 are solenoid operated by means energized in accordance with the novel electrical circuit of our invention which will hereinafter be described.

In the foregoing we have described only the hydraulic system which is to be indirectly controlled by the program of novel stop units of our invention.

For the convenience of the operator in making a set-up for the step-by-step movement of the back gauge 201, said movement is transferred to a carriage 63 (Figure 17) which traverses on a rectangular bar 64 supported on brackets 65 and 66. These brackets are secured to the frame 225 of the paper cutting machine by screws or in any other suitable manner.

As heretofore described, the carriage 63 duplicates the movement of the back gauge 201, i. e., when the back gauge 201 is all the way back, the carriage 63 will be over to the right-hand side and as the back gauge 201 moves forward, the carriage 63 will move to the left as viewed in Figure 1.

Supported on the carriage 63 is a photo-tube 360 and a light source 359. Between them is located the stop and trim out units, the construction of which forms one of the main objects of our invention.

Referring to Figure 17, carriage 63 is guided by the rectangular bar 64 which is attached by screws 350 and 351 to the brackets 65 and 66. Extensions 352 and 353, integral parts of brackets 65 and 66, are attached by screws 354, 355, 356, 357 to the frame 225 of the paper cutting machine.

Figures 19, 20, 21, 22:
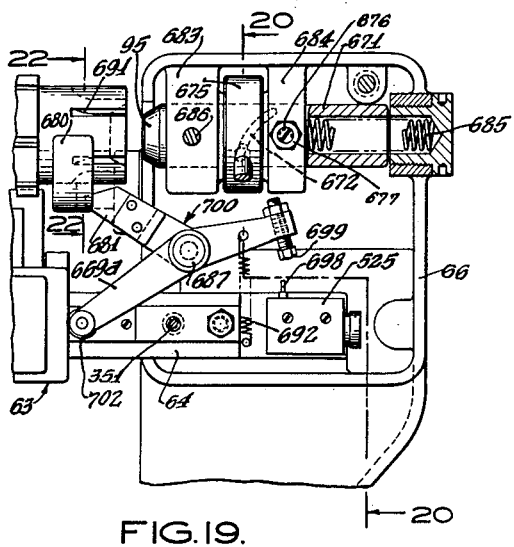
Figure 19 is a partial front view of the cutting machine with the cover removed.
Figure 20 is a view taken along line 20—20 of Figure 19 and shows the position of the main handle when the hexagonal bar is removed.
Figure 21 is a view taken along line 21—21 of Figure 18.
Figure 22 is a view taken along line 22—22 of Figure 19.
Figures 30, 31:
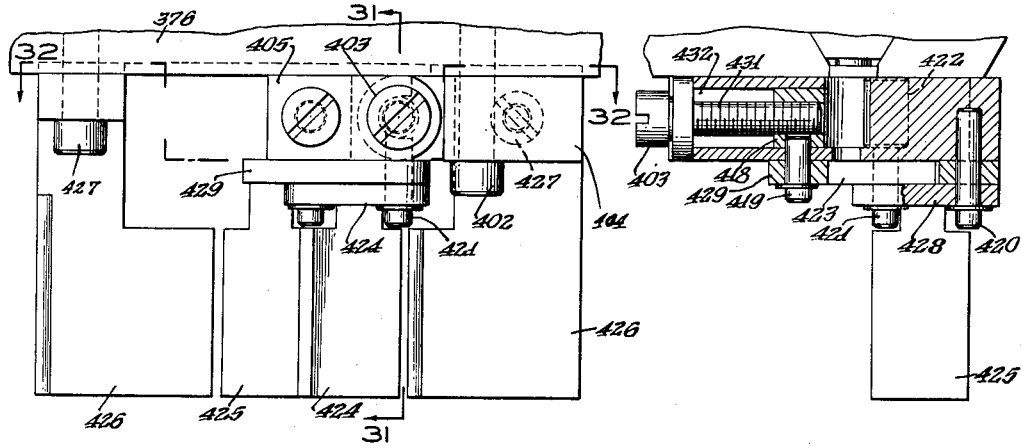
Figure 30 is a front view of another novel combination stop unit of our invention.
Figure 31 is an end view taken along line 31—31 of Figure 30.

The carriage 63 travels along the bar 64 due to the motion imparted to it by the cables 60 as was heretofore described. That is, the movement of the back gauge 201 is duplicated by the carriage 63 so that when the back gauge is all the way back, the carriage 63 is all the way to the right and as the back gauge moves forward, the carriage 63 will move to the left. The carriage 63 carries the housing 364 in which is mounted a light source 359. A slit 365e (as shown in Fig. 21) in the housing 364 permits the light from source 359 to travel directly to a photo-electric cell 360. The photo-electric cell 360 is mounted horizontally in the housing 361 which in turn is rigidly attached to the carriage 63. A magnifying glass 362 is mounted on the housing 361 and is located between the light source 359 and photo-electric cell 360. The magnifying glass 362 is so mounted that a sharp and magnified image of the edges of the electronic signal stop unit 365 (Figs. 24 and 25) will be projected onto the photo-electric cell 360 by the light source 359. The magnifying glass 362 enlarges the narrow strip of light of source 359 and thereby illuminates a larger portion of the light responsive surface of the photo-electric cell 360 or conversely to darken a larger portion more quickly than would be the case without the magnifying glass 362.

The photo-electric tube 665 is mounted adjacent the photo-electric tube 360. However, the less sensitive tube 665 serves only as a switching device to indicate an accurate stop of the back gauge 201 as will hereinafter be more fully explained.

The energy required to drive the back gauge 201 is derived from a solenoid operated hydraulic system. However, the control of the solenoids stems from the photo-electric cell circuit and the position of the knife bar and clamp as follows:

After the knife blade 668 and clamp located behind the knife bar have cut a lift of paper, it will return to its initial extreme upper position. While the blade 668 and clamp are traversing the path to return to the extreme upper position, the knife bar will trip a knife starting switch in the photo-electric cell and solenoid circuits. This permits the solenoid operated hydraulic system to drive the back gauge 201 forward and also permits the photo-electric cell to control the operation of the hydraulic system.

The photo-electric cell is either illuminated or dark and the change from one to the other is responsible for the control of the hydraulic system. Preferably, the photo-electric cell 360 is illuminated when the back gauge is travelling at high speed. When this illumination is interrupted by a signal unit and the photo-electric cell is dark, the photo-electric cell will cause the electric circuit to slow down the hydraulic motor. When the photo-electric cell is again illuminated, it will cause the hydraulic motor to stop.

One feature of our invention is the design of the signal units which will interrupt the illumination of the photo-electric cell. A second feature of our invention is a novel means for positioning and locating these stop units. A third feature is the novel electric circuit which will now be described.

*Electrical circuit*

The electrical circuit which controls the solenoid valves B₁ and A₁—A₂ of the hydraulic system noted in Figures 5 to 8 will now be described in connection with Figures 9 to 16. The figures are all similar showing the control system, solenoids, relays and time delay mechanism which are required to achieve the automatic spacing feature of our electronic spacer cutting machine and differ only in the emphasis of the various circuits which are used for purposes to be hereinafter described.

Figure 7:
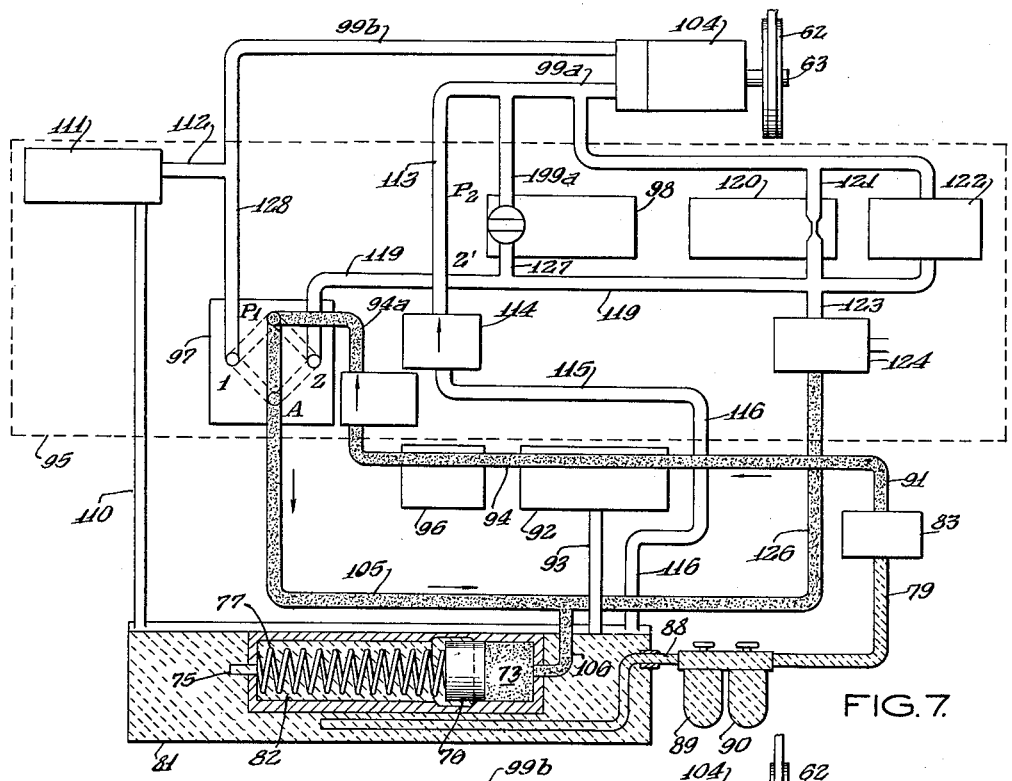

As hereinbefore noted, the solenoid valve B₁ has either an open or closed position. When the solenoid B₁ of the electrical circuits is energized, the solenoid valve B₁ will be open and thus connect the port P₂ to the port 2′ as noted in Figure 5. The other solenoid valve A₁—A₂ has three possible positions as may be observed by comparison of Figures 5, 7 and 8. The position of the solenoid valve A₁—A₂ of Figure 6 is achieved when the solenoid A₂ is energized. The position of Figure 8 is achieved when the solenoid A₁ is energized and the position of Figure 7 is achieved when neither solenoid A₁ nor A₂ is energized. As will hereinafter be apparent, solenoids A₁ and A₂ are never simultaneously energized.

The electrical circuit consists of the above-mentioned three solenoids A₁, A₂ and B₁, six coils, nine switches, a timer mechanism, two photo-electric cells and a green light circuit.

Switches

The push button controlled forward switch 545 has a normally open section 545b at terminals 653 and 654 and a normally closed section 545a at terminals 655 and 656. The forward switch is manually controlled from the front of the cutting machine and is used by the operator to effect the initial movement of the back gauge 201. After the operator releases the forward switch 545, a lock-in circuit by-passes this switch to ensure continued automatic operation. As will hereinafter be more fully explained, the circuit is designed to ensure that the back gauge 201 and carriage 63 will stop at positions indicated at the left-hand edge of a stop unit even though the operator continues to keep the forward switch 545 depressed.

A normally closed push button controlled stop switch 527 is provided and is physically located in the front panel of the machine by the forward switch 545. The stop switch 527 when depressed will cause all operation of the hydraulic motor 104 and back gauge 201 to cease.

A third switch on the front panel is the hand automatic switch 590. The switch 590 in the down position across terminals 587 and 588 permits the cutting machine to operate automatically after the forward switch has been depressed. Switch 590 in the up position across terminals 591 and 589 permits complete control of the back gauge 201 by means of the forward switch 545 irrespective of the location of the stop units.

The reverse switch 530 has two sections. The first section 530a is normally closed across terminals 657 and 658 and the second section 530b is normally open across terminals 659 and 660. The reverse switch 530 is pushed by the operator when the gauge has reached its forward-most position. When the reverse switch 530 is engaged, it will cause solenoid A₁ to be energized to permit the hydraulic motor 104 to drive back gauge 201 in reverse to its rearwardmost position.

A knife switch 410 is located in the circuit in electrical parallel with the forward switch 545b and is normally open across the terminals 661—662. The knife switch 410 is operated by the upward or return movement of the knife blade and clamp and acts to initiate automatic operation of the back gauge 201 after a lift of paper has been cut. As will hereinafter be apparent, the forward switch 545 operated by the operator and the knife switch 410 actuated by the knife driving mechanism both serve in the same manner to initiate forward operation of the stopped back gauge 201.

A safety switch in the form of the index bar switch 525 is also provided. As will hereinafter be more fully explained, when the hexagonal bar 376 which carried the progressive stop units is locked in position, the index bar switch 525 will be actuated to connect the terminals 663—664 and thus permit operation of the back gauge 201. Hence, unless the hexagonal bar 376 is locked in place, the safety feature of index bar switch 525 prevents operation of the back gauge 201.

Lock-up switch 523 is provided to open the electric circuit when the screw 204 has been clamped in its forward bearing 206 which the operator accomplishes by turning a knob so that the back gauge cannot be moved in either direction.

The forward limit switch 532 is provided to interrupt the electric circuit when the back gauge 201 approaches its most forward position. The reverse limit switch 549 is provided to interrupt the electric circuit when the back gauge 201 reaches its most rearward position and the side gauge limit switch 547 is adjustable and may be set so that the back gauge 201 can be stopped automatically when it is moving rearwardly anywhere between its foremost and rearmost positions.

Relays

The electrical circuit of Figures 9 to 16 also has the seven relays CR1, CR2, CR3, CR4, CR5, PR1 and PR2. The relay coil CR1 has a normally closed contact CR1a and a normally open contact CR1b. When relay coil CR1 is energized contact CR1a opens the energizing circuit for relay coil CR3 and contacts CR1b close a portion of energizing circuit for relay coil CR4. Relay coil CR2 has two normally open contacts CR2b and CR2bb. When relay coil CR2 is energized, contact CR2b initiates operation of the timer relay 580 and contact CR2bb completes the lock-in circuit for either the forward switch 545b or the knife switch 410. Relay coil CR3 has one normally closed contact CR3a and two normally open contacts CR3b and CR3bb. When relay coil CR3 is energized, contact CR3a opens the energizing circuit to the fast solenoid B₁, contact CR3b completes a by-pass for contact CR1a and completes a holding circuit for relay coil CR3 and contact CR3bb completes an energizing circuit for the relay coil CR4. Relay coil CR4 has one normally closed contact CR4a. When relay coil CR4 is energized, its associated contact CR4a will open the energizing circuit for relay coil CR2 and forward solenoid A₂.

Relay coil CR5 is energized when the reverse switch 530 is depressed. Its contact CR5b will complete a lock-in circuit for the reverse switch 530b and complete an energizing circuit for the reverse solenoid A₁ and the other normally open contact CR5bb will complete an energizing circuit for the fast solenoid B₁. Coil PR1 has a normally open contact PR1b which partially completes an energizing circuit for relay coil CR1. The coil PR1 is only energized when a light beam impinges upon photo-electric cell 360.

The relay coil PR2 has a normally closed contact PR2a which partially completes an energizing circuit for a green light signal lamp 600. The relay coil PR2 is energized when full light impinges upon the photo-electric cell 665 as will hereinafter be more full explained.

Photo-electric cell

Two photo-electric cells 360 and 665 are carried in the carriage 63 and connected to the electrical circuit. The main photo-cell 360 is very sensitive and will energize the relay PR1 when the light beam from source 359 impinges fully on the tube. A second photo-electric cell 665 is provided for the green light circuit.

As will hereinafter be more fully explained, the circuit informs the operator when the back gauge 201 has made an accurate predetermined stop. When the full light beam impinges upon the photo-electric cell 665 it energizes the relay coil PR2.

In addition to the various switches, valves, solenoids and relay coils, the electric circuit is also provided with a time delay relay 580. This has three sets of terminals 582—583, 577—578 and 574—575. A 110 volt supply is also supplied to the terminals 574—575. The normally open contact CR2b across terminals 577 and 578 will initiate operation of the timer mechanism 580 when relay coil CR2 is energized.

After a predetermined lapse of time, the timer 580 will complete the circuit at terminals 582—583 to thus permit energization of fast solenoid B₁. The electrical circuit is designed to permit the hydraulic motor 104 to initiate forward movement of the back gauge 201 at a slow speed. However, slow speed movement continues only for a fractional second until the timer mechanism 580 connects terminal 582 to terminal 583 to thus permit energization of fast solenoid B₁ and hence drive the back gauge 201 forward at a fast speed.

The various interrelations of the circuit components as they occur for automatic operation of our electronic spacer cutting machine will now be described.

To perform the operation of cutting a lift of papers, the operator must take the following step before initiating operation.

(1) A program of stop units individual to the lift of paper to be cut is placed on a hexagonal bar 376 as will hereinafter be fully described.

(2) Lock the hexagonal bar 376 in place so that index bar switch 525 is automatically closed.

(3) Move the back gauge 201 to the rear of the machine and place the lift of paper on the cutting table 100 against the back gauge 201.

(4) Place the hand automatic switch 590 in the down position so that contact between terminals 587—588 is closed and open between terminals 589—591.

Since the program of stop units individual to the lift of paper has previously been set in the hexagonal bar 376, the stop units will not interrupt the light and 100% of the light beam from source 350 will impinge upon photo-electric cells 360 and 665. As was heretofore noted, this will cause both relay coils PR1 and PR2 to become energized and thus close contact PR1$b$ and open contact PR2$a$.

Figure 9:
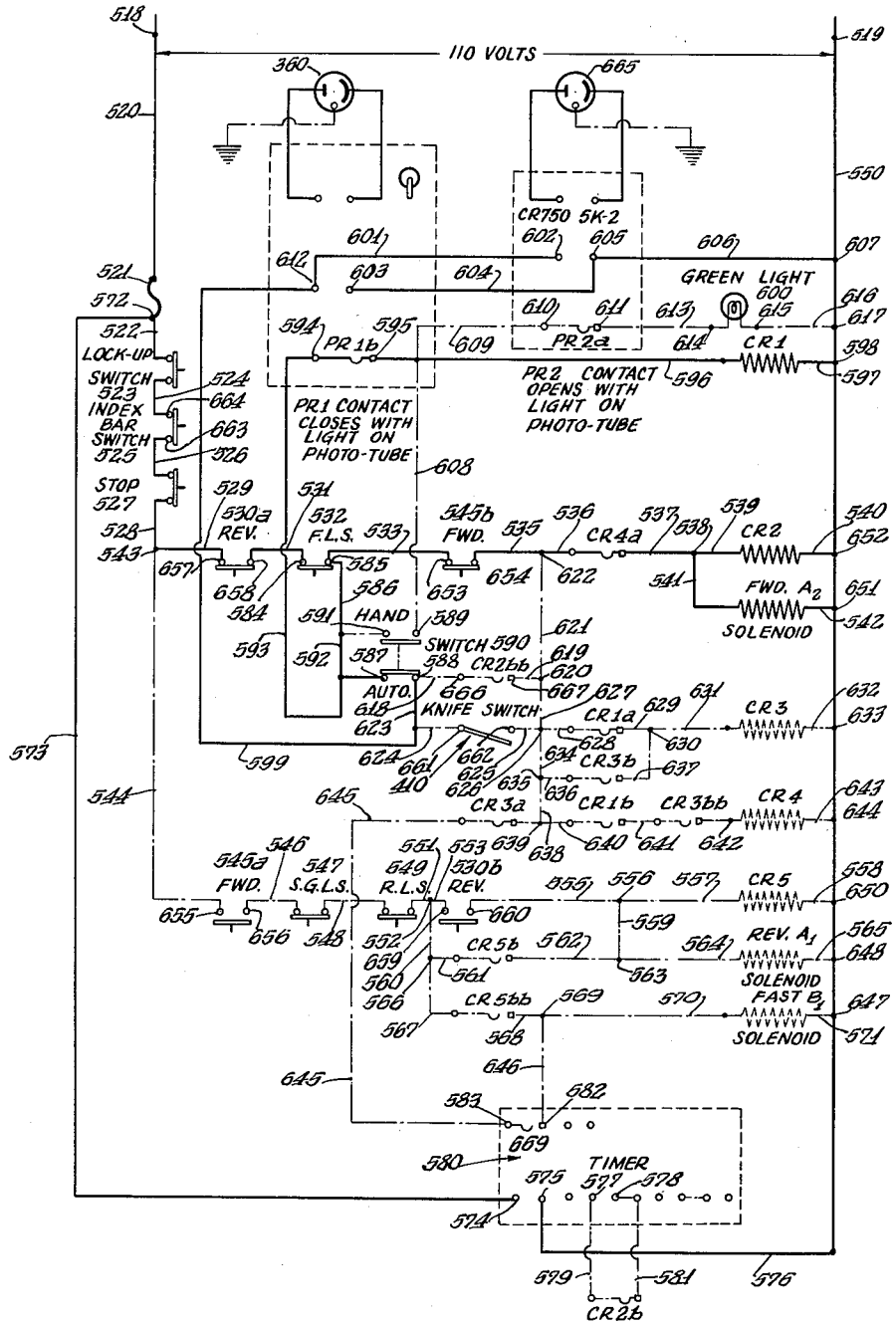
Figure 9 is a complete novel diagram showing the photo-tubes, relay coils and contacts, valve solenoids, switches and timer mechanism of our invention. The heavy lines or emphasized conductors show the circuits energized when slow forward operation is initiated by depressing the forward switch.

As may best be seen in Figure 9, this has two immediate effects: (1) to open the electric circuit to the green light stop indicator 600; (2) it completes an energizing circuit for the relay coil CR1.

Energization of relay coil CR1 opens contacts CR1$a$ to thus interrupt one of the energizing circuits for relay coil CR3 and closes contact CR1$b$ to complete a portion of the energizing circuit for relay coil CR4.

The operator then initiates operation of the automatic spacer cutting machine by pressing the forward button 545. This switch completes an energizing circuit for the forward solenoid A₂ and the relay coil CR2 as follows: Terminal 518, conductor 520, fuse 521, terminal 572, conductor 522, lock-up switch 523, conductor 524, terminals 664, index bar switch 525, terminal 663, conductor 526, stop switch 527, conductor 528, terminal 543, conductor 529, reverse switch 657—658, conductor 531, forward limit switch 532, conductor 533, terminal 653, forward switch 545$b$ (now momentarily closed by the operator), terminal 64, conductor 535, terminal 622, conductor 536, contact CR4$a$, conductor 537, terminal 538, through relay coil CR2 and forward solenoid A₂ in parallel to conductor 550 to terminal 519.

Energization of the forward solenoid A₂ will move the solenoid valve A₁—A₂ from the position of Figure 7 to the position of Figure 6. Fast valve solenoid B′ is not energized. Valve B₁ will remain closed. As heretofore mentioned, with the valves in the position indicated, the hydraulic motor 104 will drive the back gauge 201 forward at a slow speed.

As will hereinafter become apparent, the back gauge 201 is driven forward at slow speed only for a fractional second before it is changed to fast speed. This change from slow to fast speed is accomplished by the energization of relay coil CR2. As was heretofore mentioned, when relay coil CR2 is energized, both contacts CR2$b$ and CR2$bb$ will close to connect terminals 577—578 and 666—667.

Figure 10:
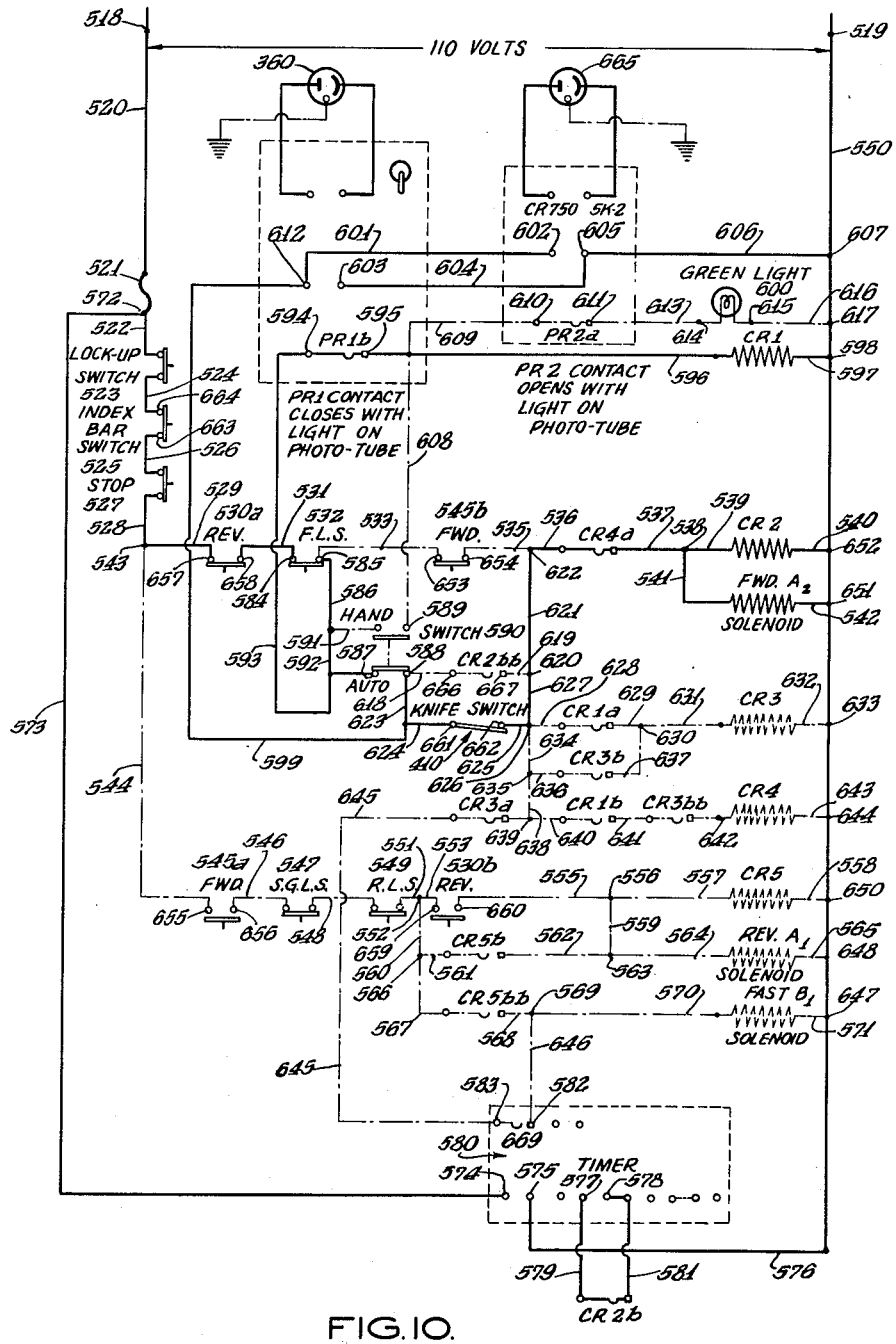
Figure 10 is a diagram similar to Figure 9 emphasizing the circuit energized when operation is initiated by the knife switch.
Figure 11:
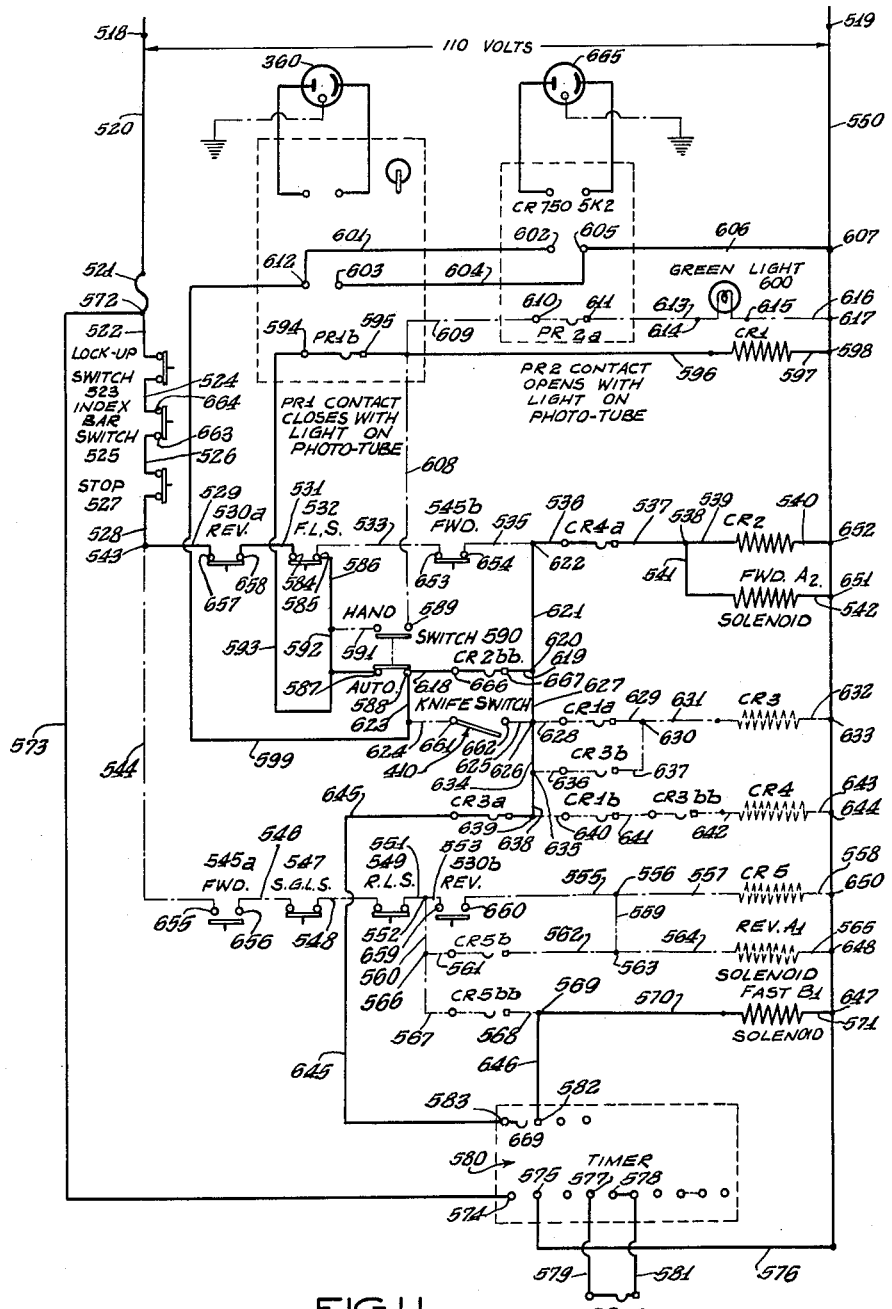
Figure 11 is a diagram similar to Figure 9 emphasizing the circuit which is energized following conditions of Figures 9 or 10. The emphasized circuit of Figure 11 will result in fast forward operation of the back gauge.

As best seen in Figures 10 and 11, the closing of contact CR2$b$ will permit the timer mechanism 580 to operate and a period of time will elapse between the time when contact CR2$b$ is closed and when timer mechanism 580 closes the contact between terminals 582 and 583. This will permit the fast solenoid B₁ to be energized by a circuit completed by the forward switch 545$b$. Hence it will be observed that the timer mechanism 580 controls the length of time which will elapse between the start of the slow and fast speed, this period of time being equal to the time between closing of contact CR2$b$ and closing of the contact at terminals 582—583.

When the operator releases the forward button 545$b$, the fast solenoid B₁ will continue to be energized by means of the by-pass lock-in circuit through the now closed contact CR2$bb$ as noted in Figure 11. With the fast valve solenoid B₁ still energized, the valve B₁ will remain open connecting part P₂ to 2′ as noted in Figure 5 and since forward valve solenoid A₂ was previously energized, the hydraulic motor 104 will drive the back gauge 201 forward at a fast speed (see Figures 5 and 11).

The circuit 599—612—601—602—603—604—605—606—607 is the 110 volt power source for the electronic (radio) tubes which amplify the minute current which flows in the photo-tube when a light beam impinges so that sufficient current becomes available to energize relay coils PR1 and PR2.

In summary, after the forward switch is depressed, the back gauge 201 is driven forward at a slow speed for a fraction of a second, the magnitude of which is governed by the timer mechanism 580. After timer 580 closes the contact at terminals 582—583, the back gauge 201 will be driven forward at fast speed. When the carriage 63 reaches the right-hand edge of the stop unit, the light beam will be interrupted and the photo-electric tubes 360 and 665 will be darkened. This de-energizes relay coils PR1 and PR2 thus causing contact PR1$b$ to open and contact PR2$a$ to close as best noted in Figure 12.

Figure 12:
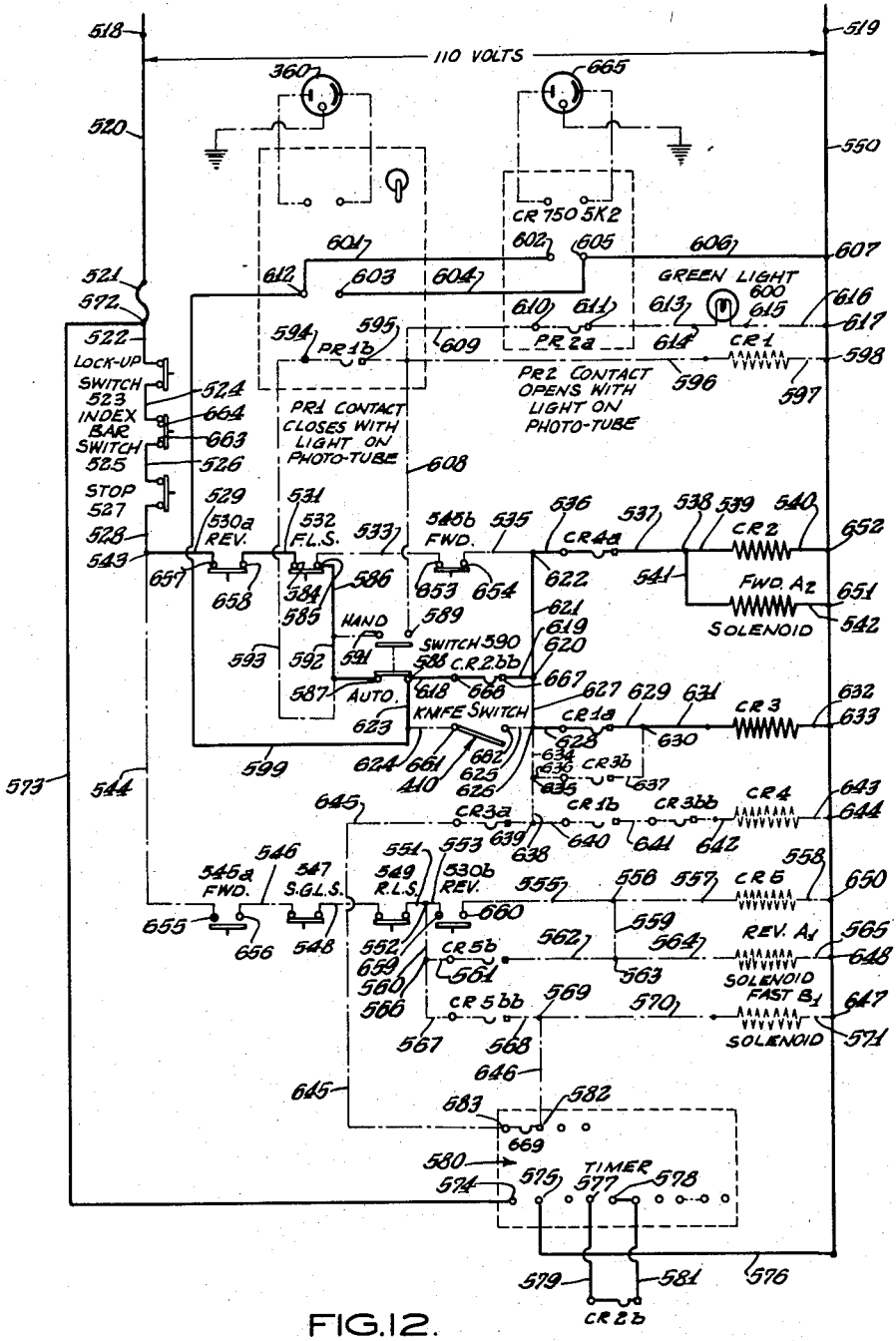
Figure 12 is a diagram similar to Figure 9 emphasizing the circuits which are energized when the circuit of Figure 11 is altered due to interruption of the light beam by the right-hand edge of a stop unit. The circuit of Figure 12 will drive the back gauge forward at a slow speed.

Hence the circuit which previously energized relay coil CR1 will now be open due to the open contact PR1$b$ (compare Figures 11 and 12). With relay coil CR1 de-energized, its contact CR1$a$ will close and contact CR1$b$ will open. Hence the energizing circuit for relay coil CR3 will be completed and thus cause its contact CR3$a$ to open and its contact CR3$b$ to close.

This will have two immediate effects: (1) contact CR3$b$ now closed will permit a lock-in energizing circuit to be completed for its relay coil CR3 and (2) cause the energizing circuit for fast valve solenoid B₁ to open, as best seen by comparing Figures 11 and 12, and this causes the valve conditions of Figure 6 to exist allowing the hydraulic motor 104 to drive the back gauge 201 forward at a slow speed.

Hence the back gauge 201 and carriage 63 will go forward at a slow speed until the carriage 63 reaches the left-hand edge of the stop unit.

At this point a portion of the light beam will again be permitted to impinge upon the photo-electric cell 360. This will permit energization of relay coil PR1 and cause contact PR1$b$ to close, this again completing an energizing circuit for the relay coil CR1 (compare Figures 12 and 13).

Figure 13:
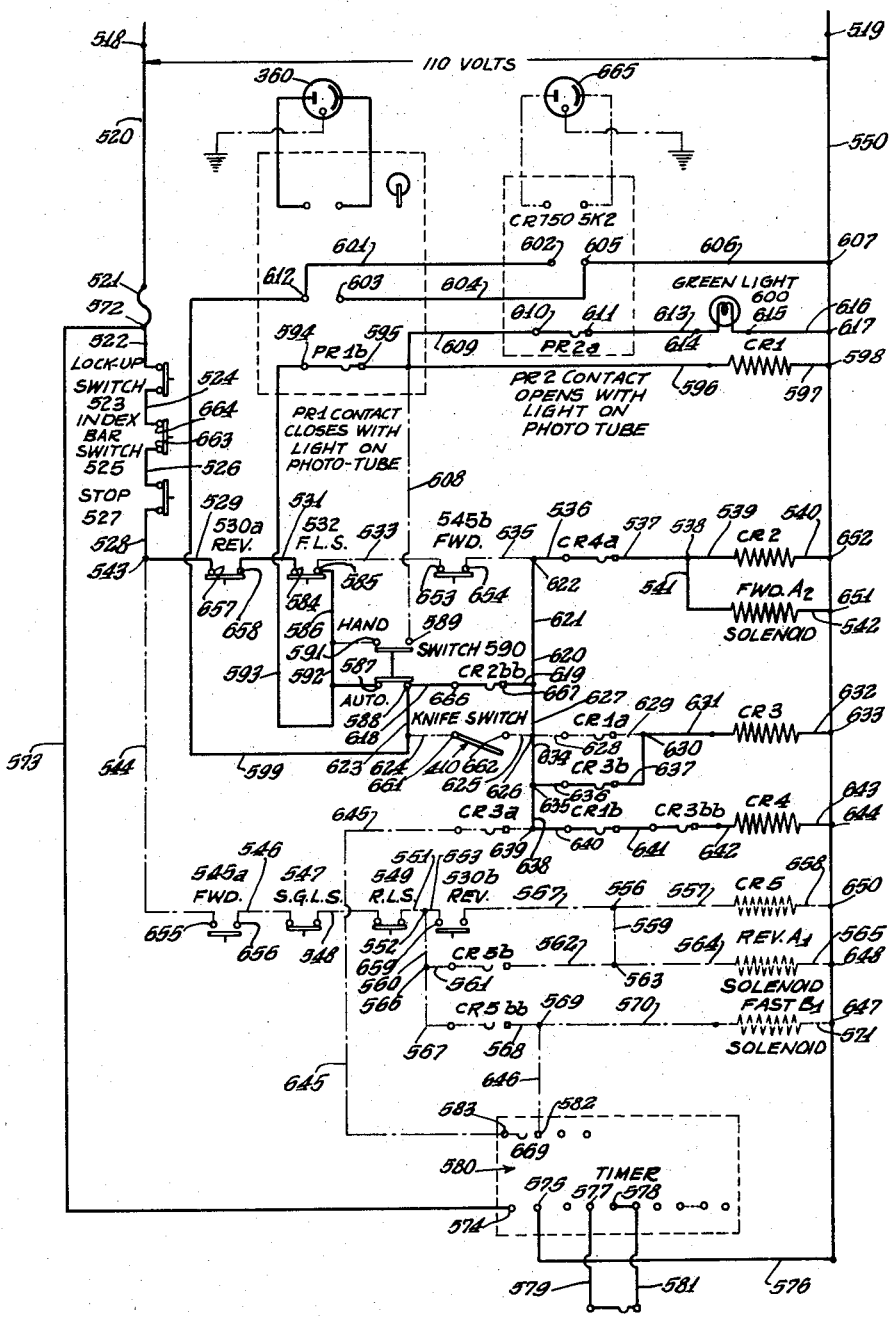
Figure 13 is a diagram similar to Figure 9 emphasizing the circuit which is energized just prior to the stopping of the back gauge. The emphasized circuit of Figure 13 occurs when the condition (Figure 12) is altered due to relighting of the photo-tube when the carriage reaches the left-hand edge of the stop unit.

Thus, its contact CR1$a$ will open and contact CR1$b$ will close. Since contact CR3$bb$ already closed due to the heretofore mentioned lock-in circuit at CR3$b$, closed contact CR1$b$ will complete the energizing circuit for the relay coil CR4 as best seen in Figure 13. This will have a degenerative effect on the circuit.

That is, relay coil CR4 when energized will cause its contact CR4$a$ to open and thus cause the relay coil CR2 to become de-energized. This will open the main by-pass contact CR2$bb$ and thus open the energizing circuit for relay coil CR4, CR3 and CR2 as well as forward valve solenoid A₂ (compare Figures 13 and 14).

Hence, with the forward valve solenoid A₂ and fast valve solenoid B₁ de-energized, the valves A₁—A₂ and B₁ will assume the position noted in Figure 7 and thus the hydraulic motor 104 will bring the back gauge 201 and carriage 63 to a stop.

If the back gauge 201 is stopped at the exact location which was predetermined by the location of the stop unit, the light beam will be able to pass the left-hand edge of the stop to impinge upon the photo-electric cell 360 but not on photo-tube 665. This illumination will be sufficient to allow the sensitive photo-tube 360 to energize relay PR1 but still no light reaches photo-tube 665 to energize the relay coil PR2.

Figure 14:
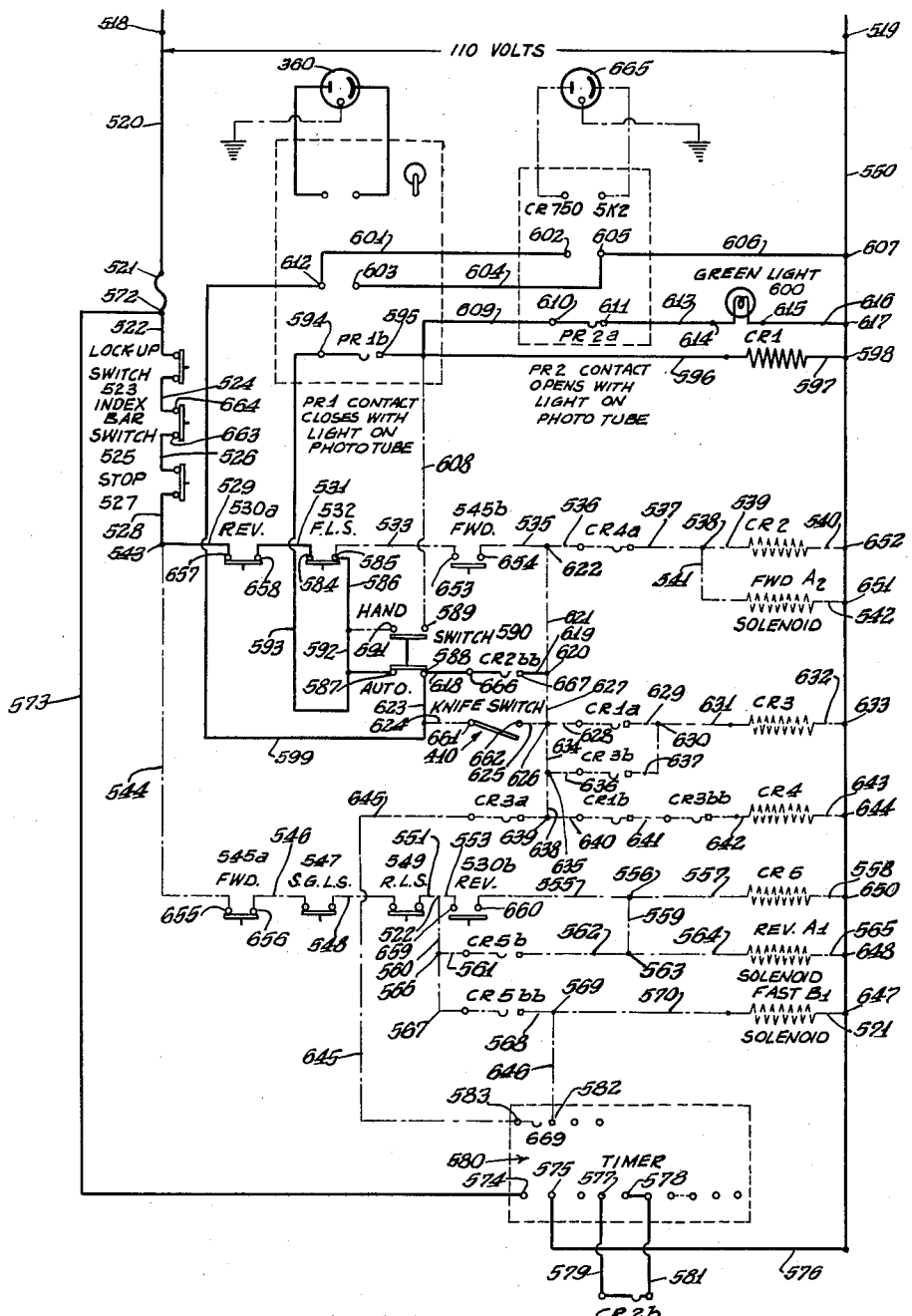
Figure 14 is a diagram similar to Figure 13 and illustrates the condition of the circuit an instant after the condition of Figure 13.

Hence, as noted in Figures 13 and 14, the contact PR1b will be closed and contact PR2a will be opened. These contacts PR1b and PR2a will complete the circuit for the green light signal 600. This will indicate to the operator that the back gauge 201 has stopped at the correct predetermined position and he may then initiate the cutting operation.

In case the back gauge 201 has overtravelled its correct position, the degree of illumination on the photo-tube 665 will increase to such an extent whereby this tube will energize relay coil PR2. This will open contact PR2a and again break the green signal light circuit. In case the back gauge 201 has stopped short, the degree of illumination will not be sufficient to cause photo-tube 665 to energize relay coil PR2.

Therefore, if the green signal light 600 is "on," it will indicate to the operator that the back gauge 201 has stopped at its correct position; if it does not light up, it indicates that the back gauge 201 has stopped short and if the green light 600 comes "on" and again goes "out," it indicates that the back gauge 201 has overtravelled.

In the case where the green light 600 indicates that the back gauge 201 has made an accurate predetermined stop, the operator can initiate the operation to cut the lift of paper. After the clamp and knife blade have performed the cutting operation, both will automatically return upward to their initial position as indicated in Figure 2.

During the upward movement of these parts, the knife driving mechanism will momentarily depress the normally open knife switch 410. As may best be seen in Figure 10, this will start another cycle by having the back gauge 20 driven forward at a slow speed. It should be observed that the knife switch 410, forward switch 545b and by-pass contact CR2bb are all in parallel. Hence when the knife switch 410 is momentarily depressed, the circuits are prepared to repeat the heretofore described sequence of back gauge movement. That is, the closing of the knife switch 410 will initiate the operation of the circuit and hydraulic system in the same manner as the closing of the forward switch 545 as heretofore described.

*Trim out*

In the case where a trim out unit is placed adjacent a stop unit in the program of units, the back gauge 201 will start from the stopped condition in slow speed and stop at predetermined location without moving at fast speed throughout its course of travel.

This is accomplished by means of the timer mechanism 580 as follows: Following an accurate stop of the back gauge 201 and the completion of the cutting operation, the knife driving mechanism will momentarily depress the knife switch 410. The circuit conditions as illustrated in Figure 10 will then prevail, and the values will be in the positions indicated in Figure 6 to drive the back gauge 201 forward at a slow speed.

It will be observed that the operation of the timer mechanism 580 has been initiated by the closing of contact CR2b. However, before the period of time required for the timer 580 to close the contact at terminals 582 and 583 has elapsed, the back gauge 201 and carriage 63 will have travelled the short distance between the left-hand edge of the stop unit and the right-hand edge of the trim out unit.

When the carriage 63 reaches this position at the right-hand edge of the trim out unit, the light beam will be interrupted. Hence, the photo-tube 360 will cause relay coil PR1 to be de-energized and thus open the contact PR1b. Since contact PR1b is in the relay coil CR1 circuit, this coil will be de-energized to thus close its contact CR1a and hence complete the energizing circuit for relay coil CR3 as is best seen in Figure 12. Energized relay coil CR3 will open its normally closed contact CR3a.

Hence, when the time period for timer mechanism 580 elapses and permits the timer to close the contact 669 at terminals 582—583, the open contact CR3a will maintain the energizing circuit for the fast valve solenoid B1 open.

Consequently, the back gauge 201 will continue to be driven forward at a slow speed until it reaches the left-hand edge of the trim out unit where it will be brought to a stop in a manner hereinbefore described.

It should be observed that the stop switch 527 is located in series with the main power supply. Hence, at any time during the forward movement of the back gauge 201 the operator can depress the stop switch 527 and cause all solenoids and coils to become de-energized and thus cause the back-gauge to be stopped.

It should also be observed that initiation of back gauge forward movement by means of the forward button 545 is not hampered even if the operator should continue to depress this switch. Assuming that the operator deliberately held the forward button 545 in the depressed position, then the same sequence of events shown in Figures 9 to 14 will occur with two exceptions—relay coils CR3 and CR4 will remain energized. Since an energizing circuit will be maintained through the forward switch 545b to relay coil CR3, this coil will remain energized and thus its lock in contact CR3b and contact CR3bb will remain closed. Since the relay coil CR1 remains energized when the back gauge is stopped (see Figure 14), contact CR1b will be closed and in series with closed contact CR3bb will maintain the energizing circuit for relay coil CR4 closed. Hence, relay coils CR3 and CR4 will remain energized and maintain contact CR4a open to ensure that relay coil CR2 and forward valve solenoid A2 are not energized.

In other words, even though the operator deliberately keeps the forward button 545 depressed, the correct sequence of operations takes place, i. e., the back gauge 201 starts to move forward at first in slow speed and then it accelerates into high speed. When a stop unit interrupts the light beam and darkens the photo-tube 360, the back gauge 201 goes into slow speed and when the tube 360 is again light, the back gauge 201 comes to an accurate stop.

*Reverse operation*

After the back gauge 201 has moved forward step by step and all the cutting operations on the lift of paper have been performed, the back gauge will reach its most forward position. It must be returned to its original rearwardmost position. To accomplish this, a reverse switch 530 is provided. As the back gauge 201 reaches the front of the cutting machine, it will momentarily depress the reverse switch 530.

Figure 15:
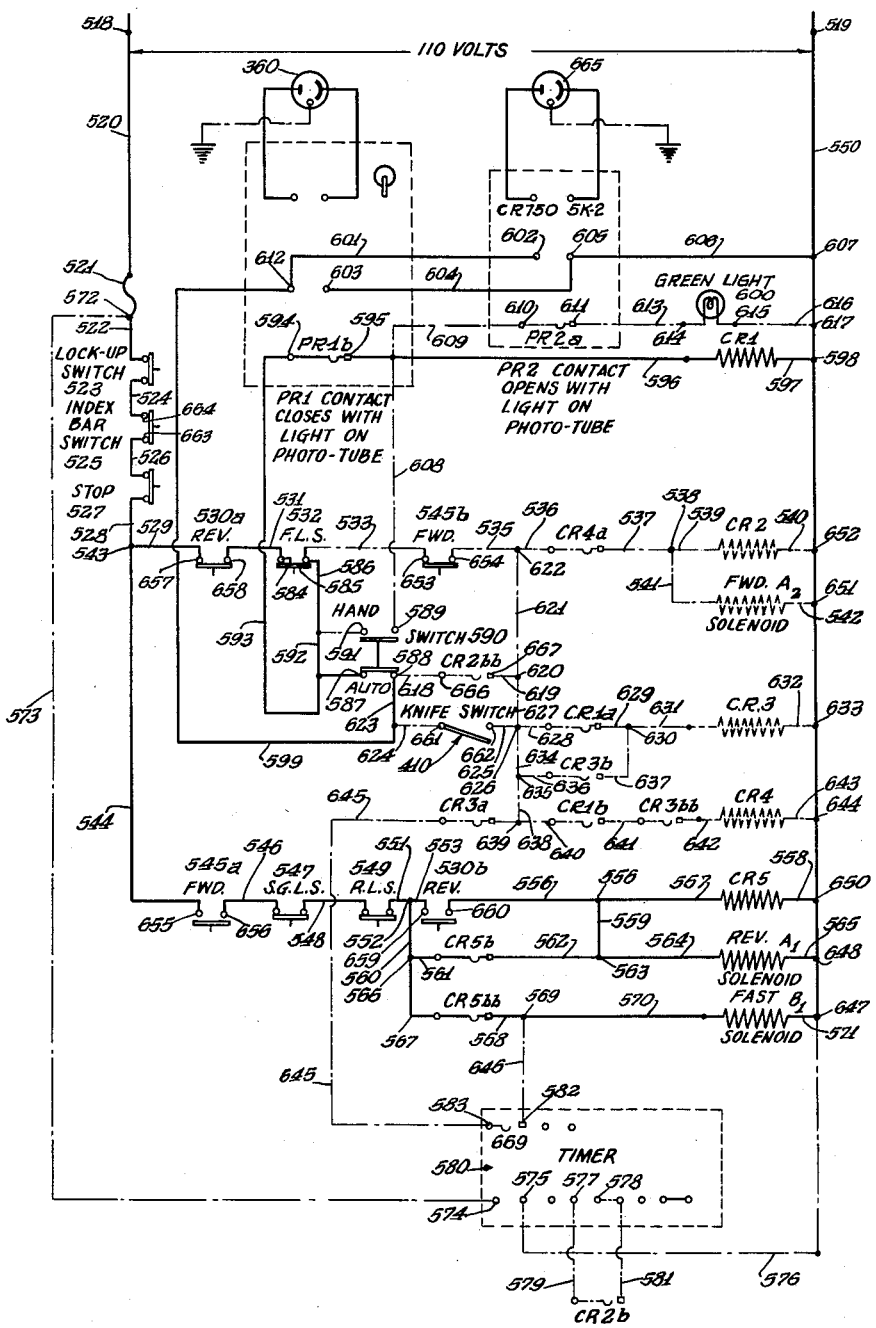
Figure 15 is an electrical diagram similar to Figure 9 but emphasizes the circuits which are energized to cause the back gauge to be driven at a fast speed in a reverse direction.

As may best be seen in Figure 15, the portion 530b of this switch completes the energizing circuit for relay coil CR5 and reverse valve solenoid A1 and portion 530a of this switch will open the energizing circuit of relay coil CR2 and forward valve solenoid A2.

Energization of relay coil CR5 will close the contacts CR5b and CR5bb, the former forming a lock-in circuit for the coil CR5 and solenoid A1, and the latter completing an energizing circuit for the fast valve solenoid B1 as seen in Figure 15.

Referring to Figure 8, it can be seen that the energization of these solenoids will cause the valves A1, A2 and B₁ to assume the position which, as hereinbefore noted, will permit the hydraulic motor 104 to drive the back gauge 201 in reverse direction at fast speed.

Hand automatic operation

To set up the program of stop units for the paper cutting machine, the operator must predetermine the spacing of cuts required for the particular lift of paper which is to be cut.

As will hereinafter be apparent, although the program of stop units is predetermined, each unit must be positioned on the hexagonal bar 376 with the carriage 63 as a guide. Hence, for the initial setting up operation of the machine it is necessary that the operator have a means of moving the back gauge forward by power which is independent of the photo-tube control.

Figure 16:
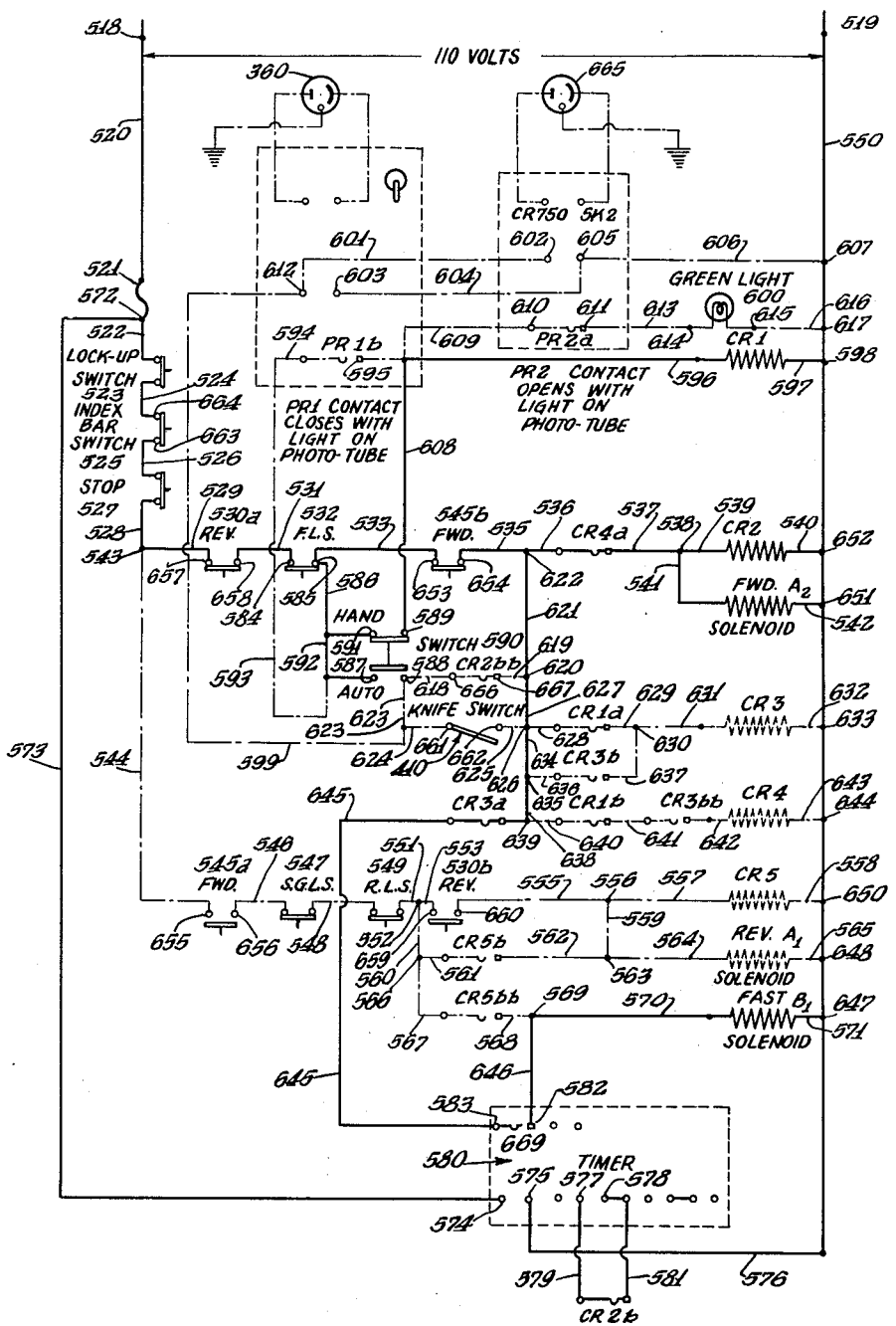
Figure 16 is an electrical diagram similar to Figure 9 but emphasizes the circuits which are energized when the hand automatic switch is in a position to permit the operator to control the back gauge movement by means of the forward switch.

As best seen in Figure 16, the hand automatic switch 590 is placed in the up position to close the control between terminals 589 and 591. Thus, when the forward button 545 is depressed both forward valve solenoid A₂ and fast valve solenoid B₁ will be energized. This will cause the valves A₁—A₂ and B₁ to move to the position noted in Figure 5 and cause the hydraulic motor 104 to drive the back gauge 201 forward at a fast speed. When the forward button 545 is released, both solenoids A₁ and B₁ are de-energized and the valves are in the position of Figure 7 and thus the back gauge is brought to a stop.

In summary, with the hand automatic switch 590 in the position of Figure 16, a depressed forward button 545 will cause valves A₂ and B₁ to shift so that the hydraulic motor 104 runs the gauge 201 forward in high speed. As soon as the forward button 545 is released, the solenoid A₂ and B₁ will be immediately de-energized, again shifting the valves A₂ and B₁ into their neutral position and bringing the hydraulic motor 104 to a stop.

Referring to Figures 17 to 22, the hexagonal bar 376 is provided to carry six different programs of stop units in the slots 367 and 505. The manner in which the trim out and stop unit are mounted on the bar 376 will hereinafter be described.

The hexagonal bar 376 is mounted on tapered shafts 93 and 95 between the two brackets 65 and 66 with means provided for locking, rotation and removal of the bar.

Hexagonal bar removal

Two boss members 683 and 684 extend from the main housing 66 with a collar 675 located therebetween. A tail stock 671 with a tapered end 95 is mounted in a cylindrical hole of the bosses 683, 684 and collar 675 as best seen in Figure 18. A screw member 693 is threadedly mounted in the bracket 66 and holds one end of biasing spring 685. The right-hand end of spring 685 is attached to the tail stock 671 and biases it to the left. The tapered end 95 engages a hollow taper 694 at the end of the bar 376. Hence with a similar arrangement in housing 65, the hexagonal bar is longitudinally held and positioned by the two tapered shafts 95 and 93.

The housing case 66a is provided with a vertical slot 673; the collar 675 has a radial hole 695, and the tail stock 671 has a helical groove 672, all three of which in alignment receive the handle 97. When the handle is in the position of Figure 17 the tail stock 671 is in its extreme left position and in engagement with the bar 376.

A clearance hole 697 in housing cover 66a and a threaded hole in boss extension 683 receives the screw 686 of handle 98. When handle 98 is rotated in one direction, the screw 687 is forced inwardly to frictionally engage the tail stock 671 and hold it in place (see Figure 17). The tail stock 671 is provided with a longitudinal groove 674 into which dog point screw 676 projects, said screw being locked by nut 677.

When it is necessary to remove the hexagonal bar 376, the tail stock 671 is moved to the right in the following manner:

Handle 98 is rotated to release the friction hold of screw 686 and tail stock 671. The main handle 97 is then pulled down to the position of Figure 20. Since the tail stock is restricted from rotational movement by screw 676, the cam action between the extension of handle 97 and helical groove 672 will force the tail stock to the right against the bias of spring 685 and out of the hollow taper 694 of the hexagonal bar 376.

Bearing support 680 and 680a rigidly attached to the machine frame will hold the bar 376 and permit the operator to remove it from the machine. As may best be seen in Figure 22, the bearing support 680 has an integral extension 688 which is attached to the machine frame by means of screws 689 and 690.

Locking of hexagonal bar

As heretofore mentioned, the tapered extensions 93 and 95 support and position the bar in a longitudinal direction. However, it is essential that additional means be provided to ensure that the bar 376 be locked in a predetermined circumferential position so that the stop units thereon can cooperate with the light source 359 and photo-cell 360 of carriage 63.

Means 700 is provided to ensure that the bar 376 can be locked in circumferential position. Means 700 is integrally constructed from member 669a and latch 681 and is pivoted at point 687. A spring 692 attached to the machine frame at one end and the member 669a at the other end biases the the means 700 clockwise from the dotted position of Figure 17.

The bar 376 terminates in a reduced section 701 in which circumferentially spaced longitudinal slots 691 are cut. These slots are of sufficient width to receive the latch 681 when it is biased from the dotted position of Figure 17 and hence provide a positive latch to secure the bar 376 in a predetermined circumferential position. The member 669a has an extension 699 at one end which will engage the button 698 of the index bar switch 525. Hence when the means 700 is biased to its extreme clockwise position, the index bar switch 525 is closed and permits operation of the electrical circuit as hereinbefore described.

The opposite end of member 669a has a roller 702 which is disposed in the path of the carriage 63. The member 669a can be rotated by pushing down the roller 702 and thus rotate the means 700 against the bias of spring 692 to disengage the latch 681 from slot 691.

The means 700 is also operative mechanically as well as manually. That is, when the back gauge 201 is moved in reverse direction, the carriage 63 will move from the solid position to the dotted position (see Figure 17) and engage the roller 702. This will force the member 700 into counterclockwise rotation against the bias of spring 692 and automatically open up the index bar switch 525 as well as release the latch 681 from the bar 376.

The various trim out and stop units which are positioned on the hexagonal bar will now be described.

First stop unit

One type of stop unit is illustrated in Figures 24 and 25 as stop unit 365. L-shaped stop unit 365 has a long leg 365c and a short leg 365d which is provided with a tongue 366 which fits into the dovetail groove 367 and properly aligns the stop as seen in Figure 23. The stop unit 365 is clamped to the hexagonal bar 376 by means of screw 369 and wedge-shaped nuts 370 as may best be seen in Figure 23. The right-hand edge 365a of leg 365c serves to interrupt the light beam when the carriage 63 is at a predetermined location.

When the carriage 63 is at the right of the stop unit 365, there will be no obstruction to the beam of light from source 359 and the back gauge will be moving forward at high speed. As the carriage continues to move to the left, the beam of light will be interrupted by the right-hand vertical edge 365a.

Thus, the photo-electric cell 360 will be darkened and by means of amplifier tubes and relays will cause the electrically controlled driving member to change to a slow speed. Since the back gauge is travelling at a linear speed of about seven inches per second, and an appreciable amount of time is required for the relays and drive member to respond to this signal, the carriage 63 will travel about 75–90% of the width of the stop unit 365c before the hydraulic motor 104 and back gauge 201 assume a slow speed. As the carriage 63 travels past the left-hand vertical edge 365b, the stop unit 365c again permits the beam of light to reach the photo-electric cell 360 and on this signal the photo-electric cell circuit will cause the drive member and back gauge 201 to come to a stop. However, after the photo-electric cell 360 has received this second signal, the back gauge 201 and carriage 63 will travel a certain distance beyond the left-hand edge 365b before coming to a complete halt. This is due primarily to the inertia of the system.

*Introduction to trim outs*

In the process of printing a sheet of labels on which many rows of labels appear, there will also be found strips of unprinted portions of paper. These strips are due to the space between adjacent printing plates which must be allowed between these plates to place the plate hooks which clamp the plates to the printing cylinder or base.

Thus, after a cutting operation when the back gauge need only move forward a fraction of an inch to cut these unprinted strips, it becomes necessary that the back gauge move forward only in the slow speed.

As heretofore mentioned, after the second signal has been received, the carriage 63 travels a short distance beyond the stop edge 365b before coming to a complete stop. Therefore, if another stop unit is placed at the left of stop unit 365, there will remain only a narrow slit or space for the light beam to pass between the two stops. Thus, as the photo-electric cell 360 receives the second signal at edge 365b, it will travel past this edge a small amount before the back gauge 201 comes to a stop. Hence, when forward movement of the back gauge is again initiated, the carriage 63 will reach the right-hand edge of the trim out 385 before the timer mechanism 580 has closed its contacts. Hence, as hereinbefore described, the back gauge will continue forward at a slow speed and permit a trim cut cut to be made when it comes to a stop at the left-hand edge of trim out unit 385.

Since the trim out may be as small as ⅟₁₆″ or as large as ¾″, two adjustable trim out units 371 and 372 are provided. The trim out unit 371 is suitable for widths of ³⁄₁₆″ to ¾″, while trim out unit 372 is suitable for widths of ⅟₁₆″ to ³⁄₁₆″.

*First trim out*

Referring to Figures 24b, 24c, 25b, 25c, and 26, the trim out unit 371 has a base 373 from which a thin rectangular leg 374 projects. A screw 375 connects the stop unit 371 by means of base 373 to the hexagonal bar 376 in a manner heretofore described. The hinge 377 is rigidly attached to the rectangular leg 374. The other leg 380 of hinge 377 is rotatable about the pin 378. The base 373 has an elongated slot 381 cut therein and the attachment screw 375 passes through this slot.

The stop unit 371 thus has three degrees of adjustment (1) it may be located by the screw 375 at any location in the slot of the hexagonal bar 376; (2) the hinge 377 may be opened or closed to determine the length of time that the photo-electric cell 360 will be dark to permit slow speed of the drive member.

Thus, in the hinge open position of Figures 24b and 25b it would produce a slow forward movement of the back gauge of ¾″ whereas the hinge closed position of Figures 24c and 25c will give only a ³⁄₁₆″ forward movement; (3) due to the length of slot 381, the base of the stop unit 371 can be rotated and still maintain the outer edge of the hinge 377 in alignment with the edge 365b of stop 365. This rotation of the base 373 permits the adjustment of the slot or space between the two units 365 and 371 as may best been seen by comparing Figures 25b and 25c or Figures 24b and 24c.

*Second trim out*

For very small widths of ⅟₁₆″ to ³⁄₁₆″ the trim out unit 372 is used as may be observed in Figures 24a and 25a. The base 382 is connected to hexagonal bar 376 by the bolt 386 in a manner heretofore explained and has a thin short rectangular leg 383 projecting therefrom. The short hinge leg 384 is rigidly attached to this rectangular leg 383 while the longer leg 385 is adjustable for the interruption of the light beam.

*Introduction to combination*

The two trim outs 371 and 372 each have a small hinge which may be opened or closed depending upon the width of the narrow unprinted strip of paper which is to be cut or trimmed out from the printed paper. However, since these trim out units must be adjusted to rather close limits, it is desirable to provide a more positive and more practical method of adjustment.

In addition to a trim out unit with an accurate and precise adjustment, it is also desirable to combine this with a stop unit as an integral member thus alleviating some of the positioning problems involved.

*First combination*

One trim out stop combination unit is illustrated in Figures 27, 28 and 29. The base 388 is secured to the hexagonal bar 376 by means of screw 387 in a manner heretofore explained. To this base 388 is fastened the short leg 389 of a standard stop unit by means of screws 391. The long leg 392 of the standard stop unit interrupts the light beam as best seen in Figure 28.

An adjustment screw 393 is journalled in the base 388 and leg 389. A nut 394 with a stem 395 is threaded on the adjustment screw 393. A stem 396 projects downwardly and at its upper end is rigidly attached to the base 388. A hinge 397 is fitted over the stems 395 and 396 as is best seen in Figure 29. An adjustment shaft 398 is journalled in the base 388 and its end is fastened to a mitre gear 399 which meshes with a similar mitre gear 400 fastened to the screw 393. At the other end of the adjustment shaft 398 is located the knob 401.

Thus, when the knob 401 is turned, the adjustment shaft 398 by means of mitre gears 399 and 400 will cause the adjustment screw 393 to rotate. This will cause the guided nut 394 to move along the axis of screw 393 and thus open or close the hinge 397 depending on the direction of rotation of knob 401.

The position of the part of the solid lines of Figure 27 indicates the open position of the hinge 396 when it interrupts the light beam for the longest period of time. The dotted lines of Figure 27 and position of Figures 28 and 29 show the hinge in closed position when it interrupts the beam of light for the least period of time.

*Second combination unit*

A second design for the adjustable combination of a standard stop unit and a trim out stop unit is illustrated in Figures 30, 31, 32, 33 and 34. This combination unit is constructed as follows: The base 404 is connected to the hexagonal bar 376 by the screw 402 in a manner heretofore explained. The standard stop unit 426 is attached to the right of this base 404 by the screw 427. At the left of the base 404 is mounted the trim out stop unit. A pin 420 is perpendicularly mounted and rigidly attached to the base 404. A guide groove 423 is provided in this base unit 404 and has the cylindrical guide pin 422 located within. An extension pin 421 extends vertically down from the cylindrical guide 422.

Figures 32, 33:
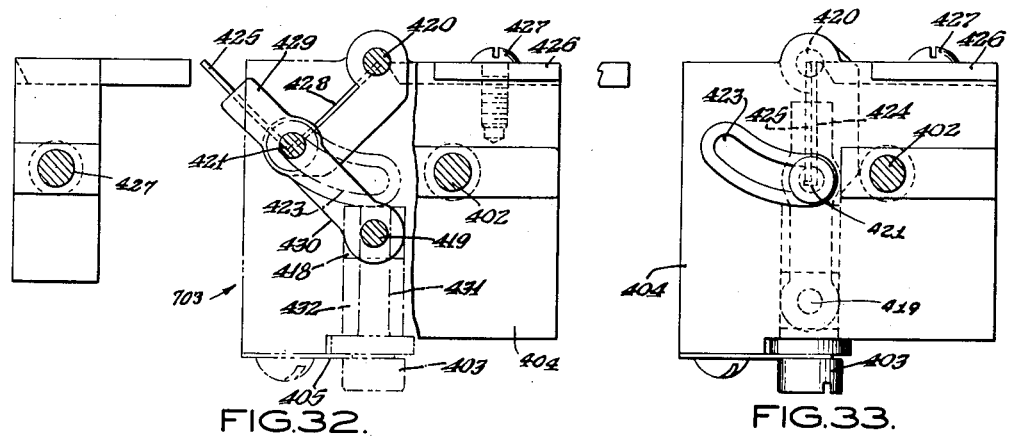
Figure 32 is a view taken along line 32—32 of Figure 30 showing the trim out unit in open position.
Figure 33 is a view similar to Figure 32 showing the hinges of the trim out unit in closed position.
Figures 26, 34:
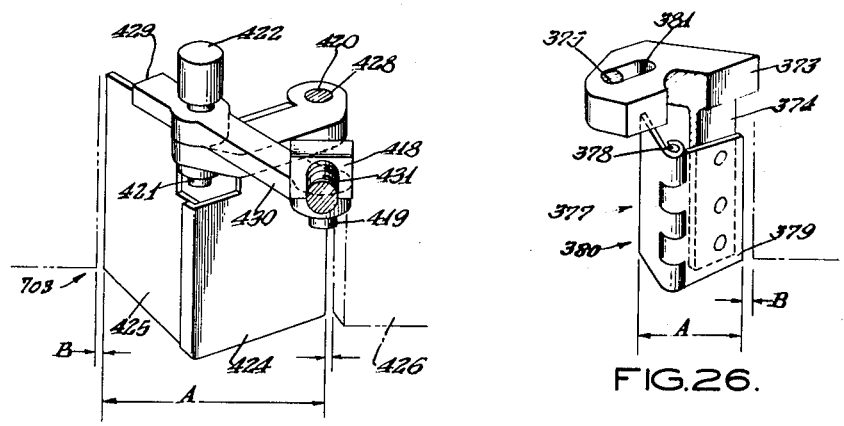
Figure 26 is a perspective view of Figures 24 and 25 showing the hinge construction of the trim out unit.
Figure 34 is a perspective view of the trim out unit of Figures 32 and 33 showing the links and construction.

Pivotally mounted on this pin 421 are the two members 428 and 429. The member 428 is pivotally mounted at its other end on the extension pin 420. The blades 424 and 425 are rigidly attached to the lower side of the members 428 and 429, respectively, and form the hinge of a trim out unit. Hence it will be observed that when the extension 430 of member 429 is moved down as viewed in Figure 32, the blades 424 and 425 will move to closed position as seen in Figure 33.

For this purpose of controlling the position of the blades 424 and 425, the adjustment screw 431 is provided. This adjustment screw 431 is confined in the body 404 by means of the retaining plate 405. A nut 418 is threaded on the screw 431 and rides in groove 432 of the base 404. A pin 419 projects from the nut 418 and is the pivot for the extension 430 of member 429.

The hinges 424 and 425 of this trim out unit may thus be opened and closed as follows: If the hinge is in the position of Figure 32 and the head 403 of the adjustment screw 431 is turned in the proper direction, the nut 418 due to its threaded engagement with the screw 431 will be guided down this screw by the guide walls of groove 432. This will cause the members 428 and 429, 430 to move in a vertical position as noted in Figure 33. In this position the hinge of blades 428 and 429 will be closed and have the smallest trim out width possible.

Third combination unit

Figure 35:
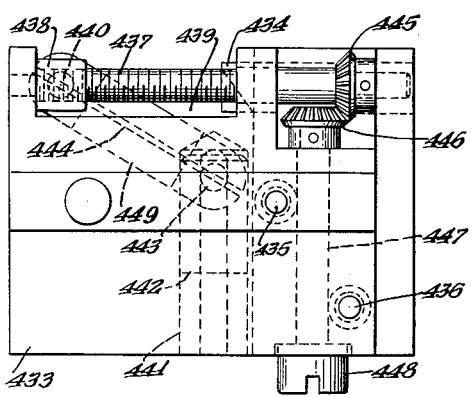
Figures 35, 36 and 37 are a top, front and end view, respectively, of a novel modified combination stop unit of our invention.
Figure 36:
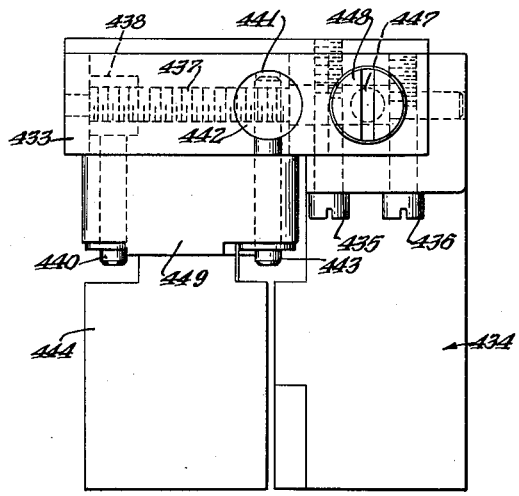
Figure 37:
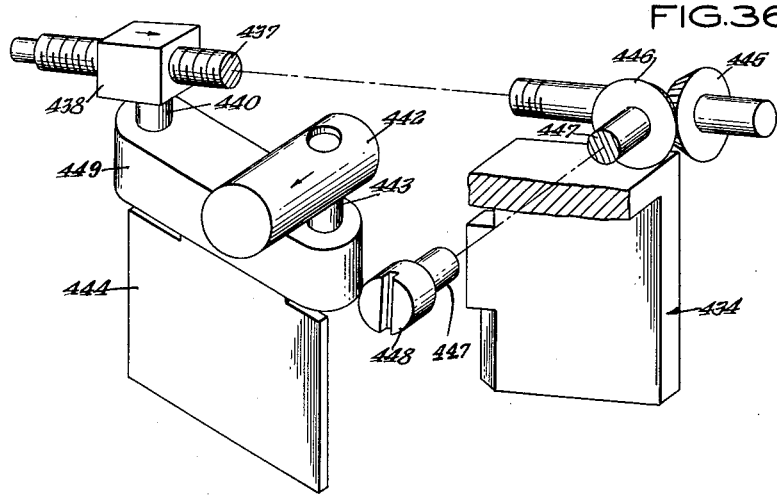

The combination unit of Figures 35, 36 and 37 is designed for trim out as small as 1/16". In this unit the base 433 is attached to the hexagonal bar 376 in the same manner as heretofore described.

A standard stop unit 434 is attached to the base 433 by means of screws 435 and 436. An adjustment screw 437 is journalled in the base 433 and the stop unit 434. A nut 438 with a pin 440 perpendicularly and rigidly attached thereto is threaded on the screw 437 and is guided in the groove 439 of the base 433. In slot 441 of the base 433 is a guide 442 from which a second pin 443 is perpendicularly and rigidly attached.

A member 449 is pivotally mounted at its ends on these pins 440 and 443. The blade 444 is rigidly mounted on the lower side of the member 449 in a slot located therein.

As seen in Figure 35, if the nut 438 is caused to move to the right, the right end of member 449 will be guided down by the pin 443 and guide 442. This will thus alter the angle of the blade and, therefore, alter the trim out dimensions. Control of the nut 438 is accomplished by bevel gears 445 and 446, shaft 447 and head 448. The shaft 447 is mounted in the base 433 and is terminated at one end on head 448 and at the other end in bevel gear 446. The adjustment screw 437 is also terminated at one end with a rigidly attached bevel gear 445 that is in mesh engagement with bevel gear 446.

Hence, when the head 448 is turned, by hand or screw driver, the shaft 447 will rotate and translate rotation to adjustment screw 436 by means of bevel gears 446 and 445. Hence, if the head 448 is rotated in one direction, the nut 438 will be found to move along the axis of screw 437. Hence, when the nut 438 is in the extreme right position, the blade 444 will be perpendicular to the screw 437 and will produce the shortest possible trim out movement of the back gauge 201.

Positioning of stop units

Thus far we have described the purpose, construction and adjustment of the trim out and stop units. However, these units must be properly located on the hexagonal bar 376 before the cutting machine can be put in operation. Means are provided whereby these trim out and stop units can be properly positioned on the hexagonal bar 376.

As may best be seen in Figure 17, a strip 460 with inches indicia located thereon extends between supports 65 and 66. The carriage 63 is provided with a magnifying glass 461 and indicator 462 so that the inches indicia on strip 460 may be read at the indicator 462 through the magnifying glass 461. The inches indicia on the strip 460 indicate the distance between the knife blade and the back gauge 201. Since the carriage 63 duplicates the movement of the back gauge, the indicator 462 will readily tell the operator the distance between the knife blade and back gauge.

Hence when sheets of printed labels are to be cut, the operator by the aid of the strip 460 will know where the stop units have to be placed. The proper placement of these stop units is accomplished as follows:

The back gauge and carriage are moved to a position where it is desired to cut the paper stack. At this point a blocking member is interposed in the plane of the stop unit. The holding screw 369 and its associated wedge nut 370 are loose to permit the operator to slide the stop unit along the dovetail groove 367. When the stop unit is moved along the groove 367 to the point where it engages the blocking member, the operator will know that it is properly placed and can thus lock the stop unit in place by means of screw 369 and wedge nut 370.

One phase of our invention concerns itself with the blocking member and how it is placed in the plane of the stop unit as will now be described.

First positioning

As may best be seen in Figures 21 and 23, a cylindrical bore 465 is provided in the carriage 63 and a hollow cylindrical tube 450 is fitted therein. Thus, tube 450 has diametrically located slots 452 to permit pin 451 to enter therethrough. The pin 451 is rigidly attached to the carriage 63 so that the slots 452 limit the upward and downward movement of the tube 450. A flanged portion 466 on tube 450 is also provided to limit the downward travel of tube 450 by engagement with surface 467 of carriage 63.

The blocking member 454 is pivoted on pin 449 which in turn is supported by the screws 457 and 458 as may best be seen in Figure 18.

A spring 453 as shown in Figure 21 is extended between the blocking member 454 and pin 451. Hence, the blocking member 454 is biased downward against the tube 450 and thus out of the path of the stop units.

When the operator wishes to place the blocking member in the path of the stop units so that these units can be set, the knurled head 456 of tube 450 is pushed upward. Since this head 456 is an integral part of the tube 450, it too will move up, pushing the blocking unit 454 clockwise against the bias of spring 453 to the position of Figure 23. The stop unit 365 can now be brought into contact with the blocking member 454 and locked in place on the hexagonal bar 376 by means of screw 369 and wedge nut 370.

After the stop unit 365 is properly placed, the knob 456 is released to permit the tube 450 and blocking member 454 to return to the position of Figure 21. In this position, the stop unit 365 is free to move past the blocking member 454 and thus other stop units can then be positioned.

The screws 457 and 458 of Figure 18 are provided to move the pin 449 and block member 454. Thus, the block member 454 can be moved laterally in relation to the center line of the photo-electric tube slit 468.

Second type of positioning device

Figure 39:
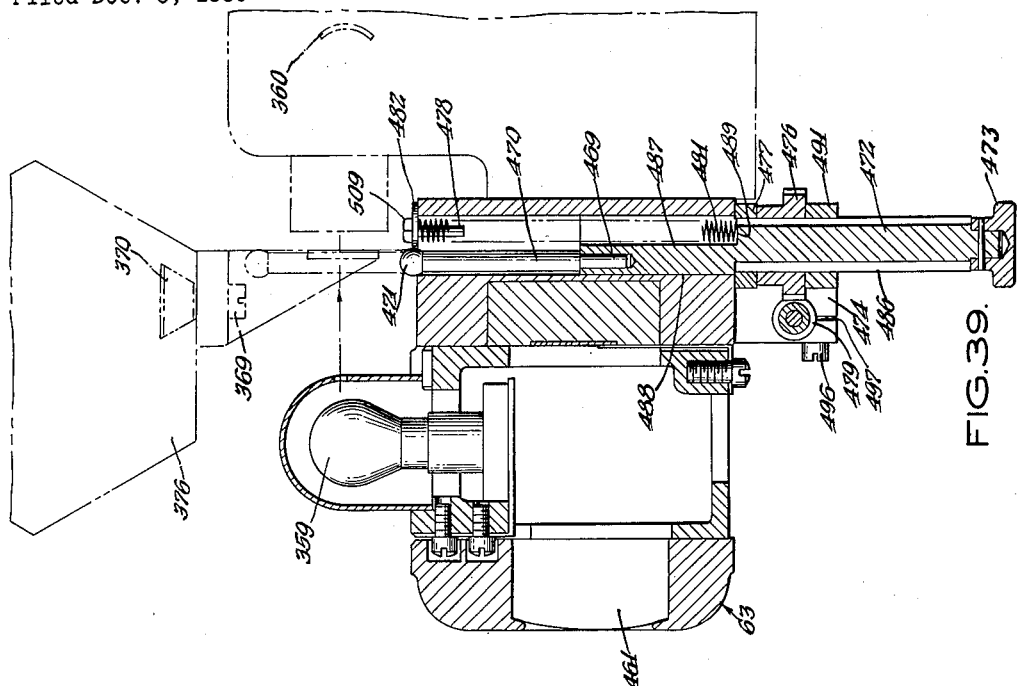
Figures 38 and 39 are a front and end view of a novel modified form of the blocking member and control.
Figure 38:
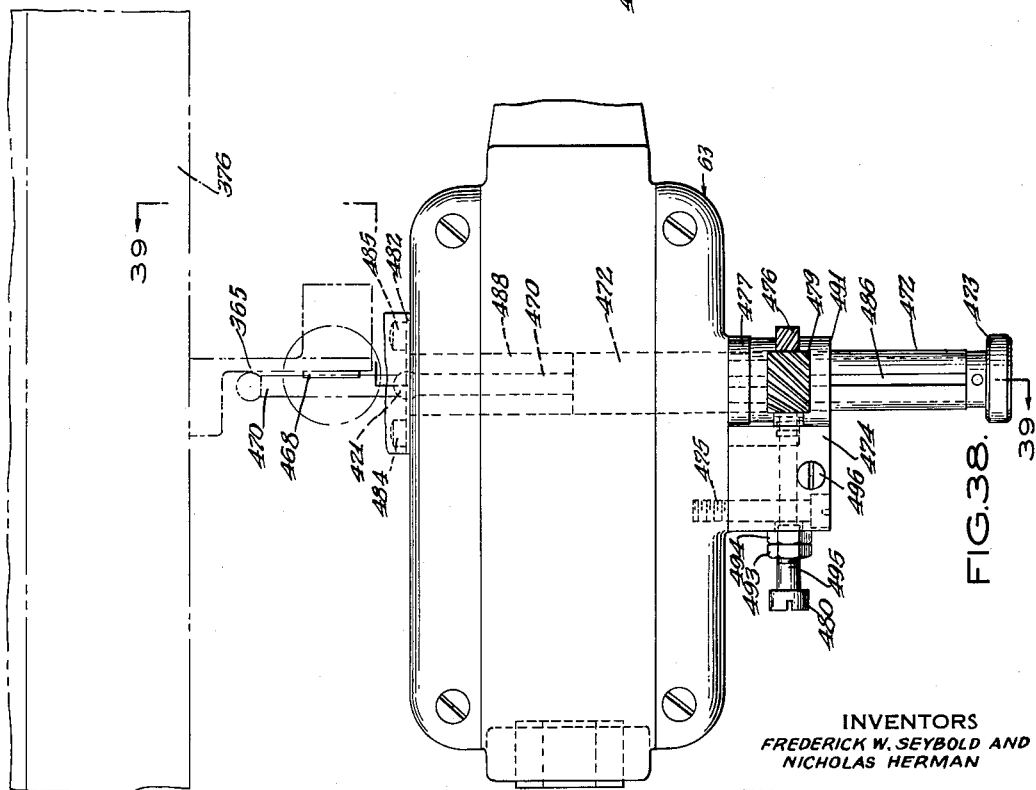

The positioning device of Figures 21 and 23 represents one form of this unit. In Figures 38 and 39 is shown another embodiment for a positioning unit in which a ball head pin is used for the blocking member and a spiral gear and worm wheel adjustment are used to position this member with micrometer precision relative to the slit 468 of the photo-tube 360.

The plunger 472 fits into a bore 488 of carriage 63. A pin 470 and its extension 469 are eccentrically and rigidly mounted in the plunger 472. Above the bore 488 is mounted a plate 482 by the screws 484 and 485 to thus limit the upward movement of the plunger 472. A cut away portion 487 in the plunger 472 houses a spring 481 which engages the plate 482 and surface 489 of plunger 472 to thus bias this unit downward. A pin 478 threaded into plate 482 and secured by nut 509 serves as a guide for spring 481.

Below the carriage 63 is mounted a bracket 474 which is attached to the carriage 63 by means of screws 475. A worm wheel 476 rests on the ledge 491 of the bracket 474 and a thrust plate 477 is interposed between the worm wheel 476 and carriage 63.

A worm 479 is journalled in the bracket 474 and is in mesh engagement with the worm wheel 476. The plunger 472 is provided with multiple splines 486 which are slidably fitted into multiple splines in the bore of the worm wheel 476.

The carriage 63 is first located at the desired position of the strip 460 (Figure 17). Then the head 473 of plunger 472 is pushed upward, thereby lifting the ball head 471 on blocking pin 470 upward to the dotted position of Figure 39. The blocking member 470 can now be properly positioned with respect to the slit 468 as follows:

Due to the mesh engagement between worm 479 and worm wheel 476, rotation of head 480 of the worm 479 will cause rotation of worm 479 and worm wheel 476. The multiple splines 486 will cause plunger 472 to rotate and due to the eccentric mounting of the blocking member 470 this member can be properly placed with hair line adjustment relative to the slit 468. The two nuts 493 and 494 are in threaded engagement with the threaded shaft extension 495 of the worm 479 to permit it to turn freely but with a minimum of back lash. After the adjustment of the blocking member 470 has been made, the screw 496 is tightened. Due to the saw cut 497 in the bracket 474 the screw 496 will compress the bore in which the shaft 495 is journalled and thus clamp this shaft 495 in its bearing.

The stop unit 365 can now be moved along the hexagonal bar 376 until it contacts the blocking member 470. A trial run will then be made to determine whether the back gauge 201 will come to a stop at the desired position. In case the run is short the ball head pin 470—471 must be moved to the left (in Figure 38) by means of the worm and worm wheel adjustment because the light impulse was received too early and the remedy therefor is to move the stop unit to the left.

In case of an overrun the adjustment must be made in the opposite direction. When this setting has been correctly made, the stop unit 365 can be locked in position by means of screw 369 and wedge nut 370. When the positioning procedure is complete, the head 473 is released and due to the bias of spring 481, the plunger 472 and blocking member 470 will move downward to the solid position of Figures 38 and 39.

*Transparent strips*

In cases where a particular setting and arrangement of stop units is used repeatedly, it may be desirable to preserve this program of back gauge control.

By any desirable means, the areas of slits and space may be made transparent and the length of stop units may be made opaque on a strip of Lucite, Vinylite or glass. The resulting strip will be an exact duplicate of the program previously set up by the trim out and stop units and can thus be used to replace these units. Such a strip is illustrated in Figure 17 with the light intercepting portions illustrated at 498 and 499 and the illuminating areas or transparent portions illustrated at 500, 501 and 502.

The strip is mounted at its ends on L-shaped brackets 503 and 504 by the screws 506 and 507, respectively, and the strip is placed in the slot 505 (see Figure 21) of the hexagonal bar 376. The brackets 503 and 504 are provided with tongues which fit into the dovetail notch 367 and are clamped to the bar 376 by screw 369 and wedge nuts 370.

Hence, when the slit 468 is behind area 500, the photo-cell will be illuminated and when the starting switch 410 is closed, the back gauge will move forward at high speed. When the slit reaches the right-hand edge of area 498, the illumination will be cut off and the back gauge 201 will move forward at slow speed. When the slit reaches the left-hand edge of area 498, the photo-cell will again be illuminated to bring the back gauge 201 to a stop. Hence the area 498 is similar to a stop unit and area 499 compares to a trim out unit, and the operation of the electrical circuit, hydraulic system and cutting machine is the same as heretofore described in connection with the program of trim out and stop units.

In the foregoing we have described our invention solely in connection with specific illustrative embodiments thereof. Since many variations and modifications of our invention will now be obvious to those skilled in the art, we prefer to be bound not by the specific disclosures herein contained but only by the appended claims.

We claim:

1. In a system for automatically moving the back gauge of a cutting machine in equal increments, a source of light and a pair of photoelectric cells, a program of stop units therebetween and having relative movement with respect thereto in synchronization with movement of said back gauge, an electric circuit associated with one of said photocells and having a drive control means, drive means for moving said back gauge controlled by said drive control means in accordance with light passing to said photoelectric cell as determined by said program of stop units, an electric circuit associated with the other of said cells, a signal means, said signal means being controlled by said latter circuit to indicate proper stop positions of said back gauge as controlled by said other cell.

2. In a device as set forth in claim 1, including a timer means in said first mentioned electric circuit, said drive control means being responsive to said timer means to effect initially slow operation of said drive means for a predetermined distance followed by subsequent fast operation.

3. In a system for automatically moving the back gauge of a cutting machine in predetermined increments, a plurality of control elements spaced in accordance with desired lengths of cut, a sensing means responsive to said spaced control elements and having motion synchronized with motion of the back gauge and adapted to move past said control elements, drive means for said back gauge, control means including speed control means for said drive means, an electric circuit for controlling said control means controlled by said sensing means responsive to spacing of said control elements so as to effect stopping of said back gauge, certain of said control elements being equally spaced from each other to provide equal increments of cut, at least one control element for effecting a trim out cut spaced at a predetermined distance from one of said equally spaced control elements, said electric circuit comprising a timer element for controlling said speed control means to determine the rate of speed of said back gauge, said timer element always effecting an initially slow speed of said drive means for a distance equal to said predetermined distance, to ensure accurate stopping of said back gauge for a trim out cut when said sensing means reaches said trim out control element, and said timer element being effective to increase the speed of said back gauge subsequent to said initial period of slow speed when said sensing means traverses the distance between two of said equally spaced control elements without stopping said back gauge for a trim out cut.

4. In a system as set forth in claim 3, said sensing means comprising a photoelectric cell and a source of light directed thereat, said plurality of stop elements comprising opaque bodies disposed between said light source and said photoelectric cell, said light source and said photoelectric cell being movable as a unit relative said opaque bodies so as to effect cutting off of light to said cell when aligned with any of said opaque bodies.

5. In a system for automatically moving the back gauge of a cutting machine in predetermined increments, drive means for moving said gauge and a control means therefor, an electrical circuit for controlling said control means, means movable in synchronization with said gauge for controlling said circuit in accordance with a predetermined program of units, said program of units comprising a bar and a plurality of spaced elements on said bar and means for sensing the spacing of said elements to energize and de-energize said circuit in accordance therewith, said bar being provided with means for securing a plurality of programs of units and being rotative about its axis to bring any selected program into operative position, locking means to lock said bar in a selected rotated position, and means including a switch in said electric circuit disposed to be engaged by said locking means for rendering said drive means inoperative unless said bar is locked.

References Cited in the file of this patent

UNITED STATES PATENTS

| | | |
|---|---|---|
| 1,901,677 | Taylor | Mar. 14, 1933 |
| 2,053,499 | Seybold et al. | Sept. 8, 1936 |
| 2,122,221 | Valiquette | June 28, 1938 |
| 2,125,074 | Long | July 26, 1938 |
| 2,245,080 | Pendleton | June 10, 1941 |
| 2,331,337 | Meyer | Oct. 12, 1943 |
| 2,410,712 | Cannon | Nov. 5, 1946 |
| 2,438,098 | Tandler et al. | Mar. 16, 1948 |
| 2,486,988 | Schafer et al. | Nov. 1, 1949 |
| 2,487,031 | Seybold | Nov. 1, 1949 |
| 2,539,373 | North | Jan. 23, 1951 |
| 2,628,539 | Neergaard | Feb. 17, 1953 |
| 2,628,680 | Seybold | Feb. 17, 1953 |
| 2,649,155 | Spiller | Aug. 18, 1953 |